US006619368B1

(12) United States Patent
Springgate et al.

(10) Patent No.: US 6,619,368 B1
(45) Date of Patent: Sep. 16, 2003

(54) METHOD FOR IMAGING INCLUSIONS IN INVESTMENT CASTINGS

(75) Inventors: Mark E. Springgate, Portland, OR (US); James R. Barrett, Milwaukie, OR (US); David Howard Sturgis, Boring, OR (US); Douglas G. Nikolas, Battleground, WA (US); Mehrdad Yasrebi, Clackamas, OR (US)

(73) Assignee: PCC Structurals, Inc., Portland, OR (US)

( * ) Notice: Subject to any disclaimer, the term of this patent is extended or adjusted under 35 U.S.C. 154(b) by 221 days.

(21) Appl. No.: 09/602,671

(22) Filed: Jun. 26, 2000

Related U.S. Application Data

(63) Continuation-in-part of application No. 09/327,038, filed on Jun. 7, 1999, which is a continuation of application No. 09/212,116, filed on Dec. 15, 1998, now Pat. No. 6,102,099
(60) Provisional application No. 60/069,597, filed on Dec. 15, 1997.

(51) Int. Cl.$^7$ ............................... B22D 1/02; B22C 9/04
(52) U.S. Cl. ...................... 164/4.1; 164/76.1; 164/517; 164/519
(58) Field of Search .................. 164/4.1, 76.1, 164/517, 519

(56) References Cited

U.S. PATENT DOCUMENTS 3,422,880 A    1/1969    Brown et al. .............. 164/5.17

(List continued on next page.)

FOREIGN PATENT DOCUMENTS

| DD | 237 907 | 7/1986 |
| DD | 237907 A1 | 7/1986 |
| DD | 237907 A1 | 5/1989 |
| EP | 0 914 884 A1 | 5/1999 |
| JP | 55114441 A | 9/1980 |
| JP | 55-114441 | 9/1980 |
| JP | 600054266 | 3/1985 |
| JP | 3-8533 | 1/1991 |
| JP | 30008533 A | 1/1991 |
| SU | 508324 | 5/1976 |
| WO | WO 99/30854 | 6/1999 |

OTHER PUBLICATIONS

Hawkesworth M.R., "Mobile Equipment for Neutron Radiography Using a Californium–252 Source", *AERE Report* (1978).

(List continued on next page.)

*Primary Examiner*—Tom Dunn
*Assistant Examiner*—I.-H Lin
(74) *Attorney, Agent, or Firm*—Klarquist Sparkman, LLP

(57) ABSTRACT

A method for imaging inclusions in metal or metal alloy castings is described. One embodiment of the present method first involves casting a metal or metal alloy article using an investment casting mold where the mold facecoat, and perhaps one or more of the mold backup layers, comprises an imaging agent distributed substantially uniformly throughout in amounts sufficient for imaging inclusions. The facecoat preferably comprises an intimate mixture of a refractory material and the imaging agent. Intimate mixtures can be produced in a number of ways, but a currently preferred method is to cocalcine the refractory material, such as yttria, with the imaging agent, such as gadolinia. The facecoat also can comprise plural mold-forming materials and/or plural imaging agents. The difference between the linear attenuation coefficient of the article and the linear attenuation coefficient of the imaging agent should be sufficient to allow imaging of the inclusion throughout the article. The metal or metal alloy article is then analyzed for inclusions by N-ray analysis. The method also can include the step of analyzing the metal or metal alloy by X-ray analysis. The imaging agent, typically a metal oxide or salt, comprises a material selected from the group consisting of boron, neodymium, samarium, europium, gadolinium, dysprosium, holmium, erbium, ytterbium, lutetium, iridium, physical mixtures thereof and chemical mixtures thereof.

80 Claims, 6 Drawing Sheets

U.S. PATENT DOCUMENTS

| | | | |
|---|---|---|---|
| 3,537,949 | A | 11/1970 | Brown et al. |
| 3,617,747 | A | 11/1971 | Wilkinson et al. ............ 164/4.1 |
| 3,994,346 | A | 11/1976 | Brown et al. |
| 4,040,845 | A | 8/1977 | Richerson et al. ......... 106/38.9 |
| 4,065,544 | A | 12/1977 | Hamling et al. |
| 4,125,144 | A | 11/1978 | Kawamoto et al. |
| 4,171,562 | A | 10/1979 | Freeman et al. |
| 4,740,246 | A | 4/1988 | Feagin et al. |
| 4,837,187 | A | 6/1989 | Frank et al. |
| 4,947,927 | A | 8/1990 | Horton et al. |
| 4,966,225 | A | 10/1990 | Johnson et al. |
| 5,145,833 | A | 9/1992 | Prunier, Jr. et al. |
| 5,183,801 | A | 2/1993 | Virkar et al. |
| 5,221,336 | A | 6/1993 | Horton et al. |
| 5,242,007 | A | 9/1993 | Remmers et al. ............ 164/4.1 |
| 5,407,001 | A | 4/1995 | Yasrebi et al. |
| 5,492,957 | A | 2/1996 | Nishikawa et al. ......... 524/430 |
| 5,535,811 | A | 7/1996 | Feagin et al. |
| 5,643,844 | A | 7/1997 | Yasrebi et al. ............. 106/38.9 |
| 5,975,188 | A | * 11/1999 | Lassow et al. ............... 164/4.1 |
| 5,977,007 | A | 11/1999 | Lassow et al. ............... 501/152 |
| 6,102,099 | A | 8/2000 | Sturgis et al. ............... 164/4.1 |
| 6,237,671 | B1 | 5/2001 | Lassow et al. ............. 164/76.1 |

OTHER PUBLICATIONS

WPI Database Publication Abstract for JP 50 082110 (1975).

Written Opinion and Search Report for PCT/US01/20325.

"Standard Practices for Thermal Neutron Radiography of Materials," *American Society for Testing and Materials*, Designation E 748–95, pp. 1–10 (1995).

"Neutron Radiography," *Aerotest Operations, Inc.* (1997).

"E545–99 Standard Test Method for Determining Image Quality in Direct Thermal Neutron Radiographic Examination," ASTM Online Standard Search/www.astm.org (published 1999).

"E2023–99 Standard Practice for Fabrication of Neutron Radiograpic Sensitivity Indicators," ASTM Online Standard Search/www.astm.org (published 1999).

"E7–00 Standard Terminology Relating to Metallography," ASTM Online Store Search/www.astm.org.

"E1320–00 Standard Reference Radiographs for Titanium Castings," ASTM Online Store Search/www.astm.org.

"E543–99 Standard Practice for Agencies Performing Nondestructive Testing," ASTM Online Standard Search/www.astm.org.

"On the Evaluation of Stability of Rare Earth Oxides as Face Coats for Investment Casting of Titanium" R.L. Saha et al., *Metallurgical Transactions B*, pp. 559–566, 1990.

"The Interaction of Titanium with Refractory Oxides" From "Titanium Science and Technology" R.I. Jaffee and H.M. Burke, eds. Plenum Press, New York, NY, 1973, pp. 271–284.

"Inspection by Neutron Radiography," Harold Berger/Metals Handbook, 8th Edition, vol. 11 (published 1976).

"Nondestructive Inspection of Castings," ASM Committee on Radiographic Inspection of Castings Metals Handbook, 8th Edition, vol. 11 (published 1976).

"Failures of Iron & Steel Castings," ASM Committee on Casting–Performance Analysis/Metals Handbook, 8th Edition, vol. 10 (published 1975).

Elihu F. Bradley, "Removal of Inclusions," High–Performance Castings/A Technical Guide, pp. 187, 277–298 (published 1989).

"E803–91Standard Test Method for Determining the L/D Ratio of Neutron Radiography of Materials," ASTM Online Standard Search/www.astm.org (published 1996).

"E748–95 Standard Practices for Thermal Neutron Radiography of Materials," ASTM Online Standard Search/www.astm.org (published 1995).

"E1496–97 Standard Test Method for Neutron Radiographic Dimensional Measurements," ASTM Online Standard Search/www.astm.org (published 1997).

"E2003–98el Standard Practice for Fabrication of the Neutron Radiographic Beam Purity Indicators," ASTM Online Standard Search/www.astm.org (published 1998).

"E14575–97 Standard Guide for Data Fields for Computerized Transfer of Digital Radiological Test Data," ASTM Online Standard Search/www.astm.org (published 1997).

"E446–98 Standard Reference Radiographs for Steel Castings Up to 2 Inch (51 mm) in Thickness," ASTM Online Store Search/www.astm.org (published 1998).

"E1955–98 Standard Radiographic Examination for Soundness of Welds in Steel by Comparison to Graded ASTM E390 Reference Radiographs," ASTM Online Store Search/www.astm.org (published 1998).

"Standard References Radiographic for Inspection of Aluminum and Magnesium Castings," Early Warning Project Group/Military Specifications Used by the Aerospace Industry (MIL–C–6021) (published Mar. 28, 1999).

"Investment Steel Castings for Aerospace Applications," ASTM Reference Radiographs of Investment Steel Castings for Aerospace Applications/ASTM: E 192 (published 1979).

"ASTM E192–75 Investment Steel Castings for Aerospace Applications," Reference Radiographs for Inspection of Titanium Castings/E 1320 (vol. 1) (published Feb. 1991).

"Radiographs Inspection," ASM Committee on Radiographic Inspection/Metals Handbook, 8th Edition, vol. 11 (published 1976).

"E186–98 Standard Reference Radiographs for Heavy–Walled [2 to 4½ Inch (51 to 114 mm)] Steel Castings," ASTM Online Store Search/www.astm.org (published 1998).

Balasko et al., *Trends in NDE Science & Technology*, vol. 3, pp. 1465–1468 (1996) (Abstract).

Berger, "The Present State of Neutron Radiography and Its Potential," *Materials Evaluation*, pp. 55–65 (1972).

Gavron et al., *SPIE—Int. Soc. Opt. Eng.*, vol. 2867, pp. 326–331 (1997).

Gibbons et al., *Nuclear Instruments and Methods in Physics Research*, vol. 424, pp. 53–57 (1999).

McClellan, "Neutron Radiography Techniques and Applications" in *Nondestructive Testing and Evaluation for Manufacturing and Construction*, ed. dos Reis et al., pp. 319–329, Hemisphere Publishing Corporation (1990).

Pfister et al., *Nuclear Science and Engineering*, vol. 110, pp. 303–315 (1992).

Richards et al., "Neutron Tomography Investigation of Aircraft Fan Blades," pp. 243–251, 41st International SAMPE Symposium, Mar. 24–28 (1996).

Richards et al., "Advanced Neutron Tomography," *Proc. SPIE*, vol. 4142, pp. 58–69 (2000).

Singh et al., *Trends in NDE Science & Technology*, vol. 3, pp. 1951–1954 (1996) (Abstract).

*Military Standard*, MIL–STD–2175A (1993).

*Military Specification*, MIL–C–6021H (1976).

* cited by examiner

FIG. 5 Alpha Case, 1800 F, 1.0 in. Thick Cross Section

METHOD FOR IMAGING INCLUSIONS IN INVESTMENT CASTINGS

CROSS REFERENCE TO RELATED APPLICATION

This application is a continuation-in-part of applicants' prior application Ser. No. 09/327,038, filed Jun. 7, 1999, which is a continuation of application Ser. No. 09/212,116, filed Dec. 15, 1998, now U.S. Pat. No. 6,102,099 which claimed priority from provisional application No. 60/069,597, filed on Dec. 15, 1997. Applicants' prior applications are incorporated herein by reference.

FIELD

This invention concerns methods for making investment casting molds comprising imaging agents in at least the facecoat of the mold, and methods for imaging inclusions in metal or metal alloy articles made using such molds.

BACKGROUND

Investment casting is a process for forming metal or metal alloy articles (also referred to as castings) by solidifying molten metal or alloys in molds having an internal cavity in the shape of such articles. The molds are formed by serially applying layers of mold-forming materials to wax patterns formed in the shape of the desired article. The first layer applied to the pattern, referred to as the facecoat, contacts the metal or metal alloy being cast during the casting process. Materials used to form the facecoat, and perhaps other "backup" layers of the mold, can flake off the mold and become embedded in the molten metal or alloy during the casting process. As a result, the metal or alloy article includes a material or materials not intended to be part of the article, such material or materials being referred to as "inclusions".

Many industries, particularly the aerospace industry, have stringent specifications as to the acceptable content and/or size of inclusions. The location of inclusions in castings can be difficult, and in some cases prior to the present invention, impossible to detect. Some inclusions, if detected, can be removed from the metal article, and the article repaired, without compromising its structural integrity.

Titanium has been used by the investment casting industry primarily for casting articles having relatively small cross sections. However, investment casting is now being considered for producing structural components of aircrafts having significantly larger cross sections than articles cast previously. Certain inclusions in relatively thin articles can be detected using X-ray analysis. For example, thorium oxide and tungsten have been used as refractories to produce mold facecoats for investment casting. Some thorium oxide and tungsten inclusions could be detected in titanium castings by X-ray analysis because there is a sufficient difference between the density of thorium oxide and tungsten and that of titanium to allow imaging of thorium-oxide or tungsten-derived inclusions. This also generally has proved true of articles having relatively small cross sections cast using molds having yttria facecoats. The difference between the density of yttria and that of titanium is sufficient to allow detection in relatively thin parts, such as engine components. But, X-ray detection cannot be used to image yttria inclusions in titanium or titanium alloy articles as the thickness of articles produced by investment casting increases beyond some threshold thickness that is determined by various factors, primarily the thickness of the cast part, the type of metal or alloy being cast, the size of the inclusion and the material or materials used to form the mold. Inclusions also cannot be detected by X-ray if the difference between the density of the facecoat material and the metal being cast is insufficient or if the size of the inclusion is very small.

Thermal neutron radiography (N-ray) imaging agents have been used in the casting industry prior to the present invention. For example, ASTM (American Society for Testing and Materials) publication No. E 748-95 states that "[c]ontrast agents can help show materials such as ceramic residues in investment-cast turbine blades." ASTM E 748-95, p.5, beginning at about line 46. This quote refers to the detection of ceramic residues by N-ray on articles having an internal cavity produced by initially solidifying metal about a ceramic core. The ceramic core is removed to form the cavity, and thereafter a solution of gadolinium nitrate is placed in the cavity. The gadolinium nitrate solution remains in the cavity long enough to infiltrate porous ceramic core residues that are on the surface of the article. The residues then can be imaged by N-ray. However, this method does not work for imaging inclusions.

SUMMARY

The present invention addresses the problem of imaging inclusions embedded in relatively thick castings. One feature of the method is the incorporation of an imaging agent into the investment casting mold, particularly in the facecoat of the mold, prior to casting so that inclusions can be imaged in the cast article.

One embodiment of the present method first involves providing a cast metal or metal alloy article made using a casting mold comprising an imaging agent in amounts sufficient for imaging inclusions, and thereafter determining whether the article has inclusions by N-ray analysis. The step of providing a cast metal or metal alloy article may comprise providing a casting mold comprising an N-ray imaging agent, and then casting a metal or metal alloy article using the casting mold. Typically, the mold facecoat, and perhaps one or more of the mold backup layers, comprises an imaging agent distributed substantially uniformly throughout in amounts sufficient for imaging inclusions. The article is then analyzed for inclusions by N-ray imaging. The method also can include the step of analyzing the metal or metal alloy by X-ray imaging. The method is particularly suitable for detecting inclusions in relatively thick articles, such as titanium or titanium alloy articles, where at least a portion of the article has a thickness of greater than about 2 inches, particularly facecoat inclusions in titanium castings. An "inclusion" can refer to materials not desired in the casting, such as inclusions derived from the mold facecoat. Alternatively, an "inclusion" can also refer to materials that should be included in the casting, such as strength-enhancing fibers, in which case the fibers can be coated with imaging agent, or intimate mixtures of fibers and imaging agents can be made and used. Detected deleterious inclusions are removed by conventional means.

Simple binary mixtures comprising an imaging agent or agents and a mold-forming material or materials can be used. The present method preferably involves forming an intimate mixture of the materials used to practice the present invention, such as intimate mixtures of refractory materials, intimate mixtures of imaging agents, and/or intimate mixtures of imaging agent or agents and a refractory or refractory materials. Intimate mixtures can be produced in a number of ways, but currently preferred methods are to either calcine or fuse the mold-forming material, such as yttria, with the imaging agent, such as gadolinia.

Alternatively, solutions of imaging agents can be used to infiltrate the mold (as opposed to a casting) prior to casting the metal article. For example, solutions comprising nitrate, halide, sulfate, perchlorate salts of imaging agents can be used to form solutions comprising such materials, and these solutions are then used to infiltrate an investment casting mold. The infiltration process can be enhanced by placing the mold in a chamber which can be evacuated, at least partially. This facilitates having imaging agent solution enter the pores of the mold.

The difference between the linear attenuation coefficient of the article and the linear attenuation coefficient of the imaging agent should be sufficient to allow N-ray imaging of the inclusion throughout the article. The imaging agent typically includes a material, usually a metal, selected from the group consisting of lithium, boron (e.g., $TiB_2$), neodymium, samarium, europium, gadolinium, dysprosium, holmium, erbium, ytterbium, lutetium, iridium, boron, physical mixtures thereof and chemical mixtures thereof. Examples of suitable imaging agents comprising such metals include metal oxides, metal salts, intermetallics, and borides. Gadolinia is a currently preferred imaging agent for imaging inclusions in titanium or titanium alloy castings.

The refractory material used to make the facecoat slurry typically comprises from about 0.5 to about 100 weight percent imaging agent, more typically from about 1 to about 100 weight percent, even more typically from about 1 to about 65 weight percent, and preferably from about 2 to about 25 weight percent, imaging agent.

DETAILED DESCRIPTION

Figure 1A:
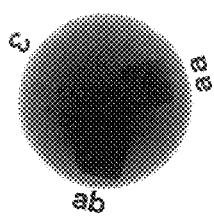
FIG. 1A is an N-ray image of an inclusion-containing test bar having three facecoat-simulating inclusions, where "aa" refers to a mixture of yttria and 2.58 weight percent gadolinia, "ab" refers to a mixture of yttria and 25.97 weight percent gadolinia, and "3" is a standard referring to 100 weight percent yttria.

The present invention concerns detecting inclusions in investment castings using N-ray analysis, or N-ray analysis in combination with X-ray analysis. The method is useful for detecting inclusions in virtually all metals or metal alloys, with particular examples being titanium metal and alloys, steel, nickel and nickel alloys, cobalt and cobalt alloys, such as cobalt-chrome alloys, metal matrix composites having fibers, and mixtures of these materials. An "imaging agent" is included, preferably uniformly, throughout at least the facecoat material of the mold so that any inclusions derived from mold-forming materials can be detected. It is possible that the mold-forming material of the facecoat (and perhaps the backup layers) can function as the imaging agent. But, most materials suitable as imaging agents are too expensive to make this approach commercially practical. As a result, the imaging agent generally is used in combination with a separate mold-forming material to form slurries useful for making investment-casting molds.

The following paragraphs discuss pertinent aspects of the investment casting process, methods for making molds comprising imaging agents substantially uniformly distributed throughout at least the facecoat in amounts sufficient for imaging inclusions, as well as methods for detecting inclusions in investment castings made using such molds.

I. Investment Casting Process

As stated above, a first step in the investment casting process is to provide a wax pattern (patterns made from other polymers also can be used) in the shape of the desired article. The pattern is serially immersed in aqueous or non-aqueous suspensions comprising mold-forming materials, such as refractory materials. Each layer of the mold can comprise the same mold-forming material, a different mold-forming material can be used to form each mold layer, or two or more mold-forming materials may be used to form either a layer or the mold.

The facecoat is perhaps the most important mold layer because the facecoat material contacts the metal or alloy in its molten state during the casting process. As most metals are highly reactive, particularly at the elevated temperatures used during investment casting processes, it follows that the material used to produce the facecoat must be substantially non-reactive with the molten metal or alloy being cast under the conditions of the casting process.

A partial list of materials useful for forming facecoats for investment casting molds includes alumina, calcia, silica, zirconia, zircon, yttria, titania, tungsten, physical mixtures thereof, and chemical mixtures thereof (i.e., reaction products of these materials). The choice of the facecoat material depends, to a large degree, on the metal being cast. Yttria is a currently preferred facecoat material for casting articles from titanium and titanium alloys, primarily because it is less reactive with molten titanium and titanium alloys than most other mold-forming materials.

Once the facecoat is solidified about the pattern, plural additional layers, such as from about 2 to about 25 additional layers, typically from about 5 to about 20 additional layers, and more typically from about 10 to about 18 additional layers, are applied to the pattern to build up the mold. These layers are referred to herein as "backup layers". Generally speaking, inclusions are derived from the facecoat material, although it is possible that inclusions may come from backup layers as well.

"Stucco" materials also generally are applied to the wet mold layers to help form cohesive mold structures. The materials useful as stucco materials are substantially the same as those materials currently considered useful as mold-forming materials, i.e., alumina, calcia, silica, zirconia, zircon, yttria, physical mixtures thereof, and chemical mixtures thereof. A primary difference between mold-forming materials and stuccos is particle size, i.e., stuccos generally have larger particle sizes than other mold-forming materials. A range of average particle sizes currently considered suitable for use in forming investment casting slurries comprising mold-forming materials (other than stuccos) is from about 1 micron to about 30 microns, with from about 10 microns to about 20 microns being a currently preferred range of average particle size. A range of particle sizes for facecoat stucco materials generally is from about 70 grit to about 120 grit. The intermediate backup layers, i.e., from about layer 2 to about layer 5, generally include stuccos having a particle size of from about 30 grit to about 60 grit. The final backup layers generally include stuccos having a particle size of from about 12 grit to about 46 grit. Stuccos, as well as mold refractory materials, can be formed as intimate mixtures with other stucco materials and/or imaging agents for practicing the present invention.

II. Imaging Agents Useful for Imaging Inclusions

Which imaging agent to use for a particular application depends upon whether X-ray analysis or N-ray analysis, or the combination of the two, is used. Also important is the impact of the imaging agent on the quality of the titanium casting, such as the amount of alpha case produced during the casting process when using imaging agents. With respect to X-ray detection, primary considerations include (1) the difference between the density of the material being cast versus the density of the inclusion, (2) the size, thickness, shape and orientation of the inclusion, and (3) the thickness of the cross section being examined. If the difference between the density of the cast material and the inclusion is small (such as less than about 0.5 g/cc for titanium or titanium alloy castings made using yttria facecoats and having a cross-sectional thickness of about 2 inches; see FIG. 6) then insufficient image contrast may be provided for suitable inclusion detection by X-ray.

The difference between densities also has to increase for successful imaging as the thickness of the article increases. For example, the density of titanium is about 4.5 g/cc and that of Ti-6Al-4V is 4.43 g/cc, whereas the density of yttria is about 5 g/cc. This difference in densities is sufficient to image inclusions by X-ray analysis in only certain titanium articles, depending upon the thickness of the article and the thickness and surface area of the inclusion. Generally, X-ray analysis has proved useful for detecting inclusions in titanium or titanium alloy articles having maximum thicknesses at some portion of the article of only about 2 inches or less.

The present invention has solved the problem of detecting inclusions in relatively thick castings where X-ray analysis alone does not suffice. An N-ray imaging agent is distributed substantially uniformly throughout the facecoat using mixtures of materials or solutions of materials, perhaps throughout one or more of the backup layers, and also perhaps in stucco material used to form the facecoat and/or one or more of the backup layers, so that inclusions containing the imaging agent can be detected. If uniform distribution of the imaging agent in the desired mold layer or stucco is not achieved, then there is the possibility that the inclusion will comprise solely mold-forming or stucco material. As a result, the facecoat-material inclusion would not be detected, and the casting might have an inclusion that sacrifices desired physical attributes.

Moreover, the present invention can be used to detect the presence of materials that are not deleterious inclusions. For example, an imaging agent or agents can be coupled with, or form an intimate mixture with, metal matrix composites having fibers particles, etc. for imaging, amongst other things, the position and orientation of the fibers.

Simple physical mixtures of mold-forming and imaging materials generally do work to practice the present invention. But, physical mixtures are not preferred. Instead, "intimate mixtures" formed between the mold-forming material and the contrast agent are preferred. "Intimate mixture" is used herein as defined in U.S. Pat. No. 5,643,844, which patent is incorporated herein by reference. The '844 patent teaches forming intimate mixtures of certain dopant materials and mold-forming materials for the purpose of reducing the rate of hydrolysis of the mold-forming materials in aqueous investment casting slurries.

"Intimate mixtures" are different from physical binary mixtures that result simply from the physical combination of two components. Typically, an intimate mixture means that the imaging agent is atomically dispersed in the mold-forming material, such as with a solid solution or as small precipitates in the crystal matrix of the solid mold-forming material. Alternatively, "intimate mixture" may refer to compounds that are fused. Fused materials may be synthesized by first forming a desired weight mixture of a source of an imaging agent, such as gadolinium oxide (gadolinia), and a source of a mold-forming material, particularly facecoat materials, such as yttrium oxide (yttria). This mixture is heated until molten and then cooled to produce the fused material. The fused material is then crushed to form particles having desired particle sizes for forming investment casting slurries as discussed above. "Intimate mixture" also may refer to a coating of the imaging agent on the external surface of the mold-forming material.

Hence, methods for the formation of intimate mixtures include, but are not limited to:

(1) melt fusion (heating the refractory material and the imaging agent to a temperature above the melting point of the mixture);

(2) solid-state sintering, referred to herein as calcination (whereby a solid material is heated to a temperature below its melting point to bring about a state of chemical homogeneity);

(3) co-precipitation of the refractory material with the contrast agent, followed by calcination; and (4) any surface coating or precipitation method by which the imaging agent can be coated or precipitated onto an outer surface region of the refractory material or vice versa.

Imaging agents currently considered particularly useful for detecting inclusions in investment castings using X-ray imaging include materials comprising metals selected from the group consisting of erbium (e.g., $Er_2O_3$) dysprosium (e.g., $Dy_2O_3$), ytterbium, lutetium, actinium, and gadolinium (e.g., $Gd_2O_3$), particularly the oxides of such compounds, i.e., erbia, dysprosia, ytterbia, lutetia, actinia, and gadolinia. Naturally occurring isotopes of these metals also could be used. Materials useful as imaging agents also could be salts, hydroxides, oxides, halides, sulfides, and combinations thereof. Materials that form these compounds on further treatment, such as heating, also can be used. Additional imaging agents useful for X-ray imaging can be determined by comparing the density of the metal or alloy being cast to that of potential imaging agents, particularly metal oxides, and then selecting an imaging agent having a density sufficiently greater than the density of the metal or alloy being cast to image inclusions comprising the imaging agent throughout the cross section of the casting.

Other factors also might be considered for the selection of imaging agents for X-ray imaging, such as the amount of alpha case produced. Alpha case refers to a brittle, oxygen-enriched surface layer on titanium and titanium alloy castings produced by reduction of the facecoat material by the metal or alloy being cast. Alpha case thickness may vary according to the temperature at which the mold/pattern was fired and/or cast. If the amount of alpha case is too extensive for a particular cast article, then such article may not be useable for its intended purpose. For titanium or titanium alloys, a currently preferred imaging agent for detecting inclusions by X-ray is gadolinia because it also is useful for N-ray imaging, and because the density of gadolinia is about 7.4 g/cc, whereas titanium has a density of about 4.5 g/cc.

Generally, other metals and/or alloys commonly used to produce investment castings, such as stainless steel and the nickel-based superalloys, have densities sufficiently different from that of the mold-forming materials used to cast such materials so that inclusion imaging by X-ray is not a problem. Nevertheless, the imaging agents stated above also can be used with these alloys.

N-ray uses neutrons as a penetrating radiation for imaging inclusions. All energies of neutrons, e.g., fast, epithermal, thermal and cold neutrons, can be used for N-ray imaging. N-ray imaging using thermal neutrons is discussed in ASTM E 748-95, entitled *Standard Practices for Thermal Neutron Radiography of Materials,* which is incorporated herein by reference. N-ray imaging is a process whereby radiation beam intensity modulation by an object is used to image certain macroscopic details of the object. The basic components required for N-ray imaging include a source of fast neutrons, a moderator, a gamma filter, a collimator, a conversion screen, a film image recorder or other imaging system, a cassette, and adequate biological shielding and interlock systems. See, ASTM E 748-95. A thermal neutron beam can be obtained from a number of sources, including a nuclear reactor, a subcritical assembly, a radioactive neutron source, or an accelerator. All sources initially produce neutrons having high energies, and such energies must be reduced in order to be used for imaging. The process of reducing neutron energy, referred to herein as moderating, can be accomplished by surrounding the source with light materials such as water, oil, plastic, paraffin, beryllium, or graphite. Moderated neutrons are preferable for N-ray imaging.

Images produced by N-ray can be recorded on a film, such as with X-ray. This is accomplished generally by placing a part to be imaged in a neutron beam, and then recording the image on film for each angle at which an image is desired. Whereas the number of film images taken for a particular part may vary, working embodiments of the method have taken 10–40 film images, which must be analyzed for inclusions by certified personnel. Each time an image is made, an unexposed film must be placed adjacent the part for exposure. The film images are taken in a protected chamber. After each image is taken, operating personnel must enter the protected chamber, place a new film cannister adjacent the part, rotate the part, and otherwise prepare the system for taking another film image at a different location of the part. Each image recorded on film takes about 15–20 minutes.

N-ray images also can be taken in real time. This is accomplished by placing a part for analysis on a rotatable carousel, adjacent an image recorder. The part is positioned in the neutron beam path, and in front of an image recorder. A certain number of frames per location are then taken, and then these frames are digitally "integrated" to produce a composite image. The number of frames taken can vary. Working embodiments of the method have taken as many as 1024 frames per location to produce an image, which is equivalent to one film shot in terms of producing an image, although not necessarily the information conveyed by such images. It typically has taken only about 30 seconds to produce these 1024 frames per location on the part. These images can be stored on standard media, such as discs. In contrast to film imaging, real time imaging does not require that the operator enter a protected chamber after each image is taken. Instead, the part is rotated to another position to allow through transmission of the neutron beam through a new portion of the part. The images produced by this method can be displayed using an image recorder, such as a light-emitting fluorescent screen. Real time imaging provides a significant labor and time savings relative to film image recording.

Whereas the selection of suitable imaging agents for X-ray detection depends upon the difference between the density of the imaging agent and that of the metal or alloy of the casting, the selection of suitable imaging agents for N-ray imaging of inclusions is determined by the linear attenuation coefficient or the thermal neutron cross section of the material being used as an imaging agent relative to that of the metal or alloy being cast. The difference between the linear attenuation coefficient or the thermal neutron cross section and that of the metal or alloy of the casting should be sufficient so that any inclusions can be imaged throughout the cross section of the article.

As with X-ray detection, N-ray detection can be practiced by simply forming physical mixtures of the imaging agent or agents and the mold-forming material or materials used to form the mold. However, as with X-ray detection a preferred method is to form intimate mixtures of the N-ray imaging agent or agents and the mold-forming material or materials selected to form the facecoat and/or the backup layers.

The materials currently deemed most useful for N-ray detection of inclusions in investment castings include those materials comprising metals selected from the group consisting of lithium, boron (e.g., $TiB_2$), neodymium, samarium, europium, gadolinium, dysprosium, holmium, erbium, ytterbium, lutetium, iridium, and mixtures thereof. Oxides of these metals currently are preferred materials for N-ray imaging, although it is possible that other materials, such as metal salts, also can be used to practice the present inclusion imaging method. Gadolinium oxide (gadolinia) is a currently preferred imaging agent for N-ray detection of inclusions in titanium or titanium alloy castings. Gadolinium has one of the highest linear attenuation coefficients of any element, i.e., about $1483.88\ cm^{-1}$, whereas the linear attenuation coefficient of titanium is about $0.68\ cm^{-1}$. Isotopes of these elements also can be used. One example of a naturally occurring isotope that is useful as an N-ray imaging agent is gadolinium 157, which has a thermal neutron cross section of 254,000 barns. The difference between the linear attenuation coefficient of titanium or titanium alloys and the linear attenuation coefficient of gadolinium makes gadolinia particularly suitable for N-ray imaging. Other imaging agents for N-ray imaging of inclusions can be selected from the group of materials having relatively large linear attenuation coefficients. For metals and/or alloys other than titanium, gadolinia also likely would be a preferred imaging agent, again primarily because of the relatively large linear attenuation coefficient of gadolinium.

Table 1 provides data concerning those materials currently considered particularly useful for N-ray and X-ray imaging of inclusions in investment castings. Data for titanium also is provided for purposes of comparison.

TABLE 1

Densities and Thermal Neutron Linear Attenuation Coefficients Using Average Scattering and Thermal Absorption Cross Sections for the Naturally Occurring Elements[A]

| Element | | Cross Section (Barns)[a] | | Density of Metal | Linear Attenuation | |
|---|---|---|---|---|---|---|
| Atomic No. | Symbol | Scattering | Absorption | Oxides (g/cc) | Coefficient $(cm^{-1})$[c] | Technique Used |
| 3 | Li | 0.95 | 70.6 | 2.01 | 3.31 | N-ray |
| 5 | B | 4.27 | 767 | 2.46 | 101.79 | N-ray |
| 22 | Ti | 4.09 | 6.09 | 4.5 | 0.58 | Reference |
| 41 | Nb | 6.37 | 1.15 | 7.03 | 0.42 | X-ray |
| 49 | In | 2.45 | 193.8 | 6.99 ($In_2O$) 7.18 ($In_2O_3$) | 7.52 | Both |
| 60 | Nd | 16 | 60.6 | 7.24 | 1.89 | X-ray |
| 62 | Sm | 38 | 5670 | 8.3 | 171.86 | Both |
| 63 | Eu | ... | 4565 | 7.42 | 94.82 | Both |
| 64 | Gd | 172 | 48890 | 7.4 | 1483.88 | Both |
| 66 | Dy | 105.9 | 940 | 7.81 | 33.13 | Both |
| 67 | Ho | 8.65 | 64.7 | — | 2.35 | Both |
| 68 | Er | 9 | 159.2 | 8.64 | 5.49 | Both |
| 70 | Yb | 23.4 | 35.5 | 9.2 | 1.43 | X-ray |
| 71 | Lu | 6.8 | 76.4 | 9.4 | 2.82 | Both |
| 77 | Ir | 14.2 | 425.3 | 11.7 | 30.86 | Both |

[A]ASTM E 748-95 with updated data primarily from Neutron Cross Sections: Neutron Resonance Parameters and Thermal Cross Sections, S. F. Mughabghab, Academic Press, Inc., San Diego, Ca, 1981.
[a]All cross-section values are most probable values.
[c]Linear attenuation coefficients were calculated using nominal elemental atomic weights and densities.

III. Forming Molds Comprising Imaging Agents

The formation of slurries for making investment casting molds by serial application of mold-forming and stucco materials to patterns is known to those of ordinary skill in the art. The present method differs from these methods by forming mold layers that comprise an imaging agent or agents. Thus, simple physical mixtures or intimate mixtures of the imaging agent and the mold-forming material are used to form slurry suspensions, typically an aqueous suspension, but perhaps also an organic-liquid based suspension. The pattern is serially dipped into an investment casting slurry or slurries comprising mold-forming material or materials and an imaging agent or agents.

The following examples are intended to illustrate certain features of the present invention, including how to make investment casting slurries and molds therefrom for practicing the present invention. The invention should not be limited to the particular features exemplified.

EXAMPLE 1

This example describes the preparation of a slurry useful for forming mold facecoats for investment castings, as well as how to make molds comprising such facecoats. Amounts stated in this and the following examples are percents based upon the total weight of the slurry (weight percents), unless noted otherwise. All steps were done with continuous mixing unless stated otherwise.

In this particular example, the facecoat refractory material and the imaging agent were the same material, i.e., dysprosia. Dysprosia is a good candidate for imaging inclusions by X-ray because it has a density of about 8.2 g/cc.

A mixture was first formed by combining 2.25 weight percent deionized water with 0.68 weight percent tetraethyl ammonium hydroxide. 1.37 weight percent latex (Dow 460 NA), 0.15 weight percent surfactant (NOPCOWET C-50) and 5.50 weight percent of a colloidal silica, such as LUDOX® SM (LUDOX® SM comprises aqueous colloidal silica, wherein the silica particles have an average particle diameter of about 7 nms) were then added to the mixture with continuous stirring. 90.05 weight percent dysprosia refractory/imaging agent was added to the aqueous composition to form a facecoat slurry. In this Example 1, and with Examples 2–3, a trace amount of Dow 1410 antifoam was added to the slurries after their formation. Moreover, and unless stated otherwise, the mixtures were made by combining the materials in the order stated in tables provided with respect to certain examples.

Wax patterns in the shape of a test bar were first immersed in the facecoat slurry composition to form a facecoat comprising dysprosia. Seventy grit fused alumina was used as the stucco material for the facecoat. Two alumina slurry layers with an ethyl silicate binder were applied over the facecoat to form the intermediate layers. The stucco material for the second and third intermediate layers was 46 grit fused alumina. Mold layers 4–10 were then serially applied using a zircon flour having a colloidal silica binder. The stucco material used for mold layers 4–10 was 46 grit fused alumina. After building ten layers, the pattern was removed in an autoclave to create a mold suitable for receiving molten titanium alloy to cast test bars.

Molten Ti 6-4 alloy was poured into the test bar mold and allowed to solidify. The mold was then removed from about the casting to produce a test bar having a diameter of about 1 inch. The test bar was then tested for the presence of α case, as discussed in more detail below.

The test bar also was subjected to X-ray imaging to determine the presence of inclusions. Because inclusions do not occur every time a casting is made, and because the location of an inclusion is difficult to predict (although software is now being developed for such predictions), a system was developed to mimic the presence of inclusions in samples made according to the present examples. A small amount of facecoat flake (i.e., a facecoat material comprising dysprosia for this example), was placed on top of a 1-inch-thick test bar. A second 1-inch test bar was placed over the facecoat flake. These two test bars were then welded together to form a 2-inch thick inclusion-containing test bar. The test bars were hot isostatically pressed (HIP) at 1650° F. and 15,000 psi to produce test bars having no detectable interface by nondestructive detection methods.

An X-ray was taken of an inclusion-containing test bar made in this fashion using the flake made from the facecoat slurry. The dysprosia inclusion was clearly seen. The fact that the dysprosia inclusions were seen clearly demonstrates that dysprosia is a good imaging agent for imaging inclusions in titanium and titanium-alloy castings using X-ray imaging techniques.

EXAMPLE 2

This example concerns the production of a facecoat slurry, molds made having such facecoat, and titanium test bars cast using such molds to determine the effectiveness of inclusion imaging using the imaging agent in the facecoat. In contrast to Example 1, this example used a physical mixture of a refractory material, i.e., yttria, with an imaging agent, i.e., dysprosia, to form the facecoat. Otherwise, the facecoat slurry and mold were produced in a manner substantially identical to that of Example 1. The materials used to produce the facecoat slurry are provided below in Table 2.

TABLE 2

| MATERIALS | WEIGHT PERCENT |
|---|---|
| deionized water | 2.64 |
| tetraethyl ammonium hydroxide | 0.79 |
| titanium dioxide | 3.22 |
| latex (Dow 460 NA) | 1.63 |
| surfactant (NOPCOWET C-50) | 0.18 |
| colloidal silica (Ludox SM) | 6.48 |
| yttria | 32.17 |
| dysprosia | 52.89 |

As in Example 1, a test bar was produced from Ti 6-4 alloy using molds with facecoats having the composition stated in Table 2. This test bar was also tested for alpha case and the alpha case data is provided by Table 5.

An inclusion-containing test bar was made using a flake comprising a physical mixture of yttria and dysprosia. The test bar made in this manner was then subjected to X-ray imaging to determine whether the inclusion could be detected. The X-ray image clearly showed the presence of the facecoat-simulated inclusion in the center of the inclusion-containing test bar.

EXAMPLE 3

This example concerns the production of a facecoat slurry, molds made having such facecoat, and Ti 6-4 test bars cast using these molds to determine the amount of α case produced in such test bars. As with Example 1, the refractory material and the imaging agent were the same material, i.e., erbia. Otherwise, the facecoat slurry and mold were produced in a manner substantially identical to that of Example 1. The materials used to produce the facecoat slurry are provided below in Table 3.

TABLE 3

| MATERIALS | WEIGHT PERCENT |
|---|---|
| deionized water | 2.13 |
| tetraethyl ammonium hydroxide | 0.64 |
| latex (Dow 460 NA) | 1.30 |
| surfactant (NOPCOWET C-50) | 0.14 |
| colloidal silica (Ludox SM) | 5.21 |
| erbia | 90.58 |

As in Example 1, Ti 6-4 test bars having a diameter of about 1 inch were cast using molds having a facecoat produced using the composition provided in Table 3. The amount of alpha case detected in test bars made according to this Example 3 is provided below in Table 5.

An inclusion-containing test bar was made using a flake comprising erbia as the refractory and the imaging agent. The test bar made in this manner was then subjected to X-ray imaging to determine whether the inclusion could be detected. The X-ray image clearly showed the presence of the facecoat-simulated inclusion in the center of the inclusion-containing test bar.

EXAMPLE 4

This example concerns the production of a facecoat slurry, molds made having such facecoat, and Ti 6-4 test bars cast using such molds to determine the effectiveness of inclusion imaging using the facecoat material. As with Example 2, the facecoat slurry comprised a physical mixture of a mold-forming material, i.e., yttria, and an imaging agent, i.e., erbia. Otherwise, the facecoat slurry and mold were produced in a manner substantially identical to that of Example 1. The materials used to produce the facecoat slurry are provided below in Table 4.

TABLE 4

| MATERIALS | WEIGHT PERCENT |
|---|---|
| Deionized water | 2.25 |
| Tetraethyl ammonium hydroxide | 0.83 |
| Titanium dioxide | 3.27 |
| Latex (Dow 460 NA) | 1.65 |
| surfactant (NOPCOWET C-50) | 0.19 |
| colloidal silica (Ludox SM) | 6.57 |
| yttria | 32.67 |
| erbia | 52.57 |

An inclusion-containing test bar was made using a flake comprising a physical mixture of yttria and erbia. The test bar made in this manner was then subjected to X-ray imaging to determine whether the inclusion could be detected. The X-ray image clearly showed the presence of the facecoat-simulated inclusion in the center of the inclusion-containing test bar.

The amount of alpha case in test bars produced as stated above in Examples 1–4 is provided below in Table 5. Because yttria has been found to minimize alpha case in titanium and titanium alloy castings, it is used as a control for comparing the alpha case results of the other materials considered useful as imaging agents.

TABLE 5

| Example No. | alpha case, inches | Left | Top | Right |
|---|---|---|---|---|
| 1. | a. Continuous | a. 0.007 | a. 0.007 | a. 0.003 |
|  | b. Total | b. 0.016 | b. 0.017 | b. 0.012 |
| 2. | a. Continuous | a. 0.003 | a. 0.003 | a. 0.003 |
|  | b. Total | b. 0.010 | b. 0.012 | b. 0.012 |
| 3. | a. Continuous | a. 0.009 | a. 0.008 | a. 0.002 |
|  | b. Total | b. 0.014 | b. 0.019 | b. 0.004 |
| 4. | a. Continuous | a. 0.002 | a. 0.002 | a. 0.003 |
|  | b. Total | b. 0.009 | b. 0.004 | b. 0.019 |
| 5. Yttria facecoat as a control. | a. Continuous | a. 0.002 | a. 0.002 | a. 0.002 |
|  | b. Total | b. 0.004 | b. 0.005 | b. 0.003 |

Table 5 shows that castings made according to the present invention may have slightly more alpha case than occurs by simply using yttria as a refractory material, as would be expected. Castings having a continuous alpha case of about 0.020 inch or less, preferably about 0.015 inch or less, and a total alpha case of about 0.035 inch or less, and preferably about 0.025 inch or less, are still considered useful castings. As a result, Table 5 shows that articles made according to the present invention are acceptable even though such castings may have slightly more α case than castings made using molds having yttria facecoats comprising no imaging agent.

However, if normal casting procedures result in too much alpha case using molds made in accordance with the present invention, then other procedures may be used in combination with the process of the present invention to decrease the alpha case. For example, the mold might be cooled from the normal casting temperature of about 1,800° F. to a lower temperature, such as a temperature of about 700° F. See the alpha case results provided below for Examples 11–17, and 19–20.

Alternatively, delay pour techniques might be used. This method comprises delaying pouring molten metals or alloys, particularly reactive metals or alloys, from a crucible and into an investment casting mold for a delay period of 1 second to 120 seconds. The delay period is increased as the quantity of material to be poured increases. The delay period is measured from the time the electrode clears the crucible to permit tipping of the crucible and the commencement of tipping of the crucible for pouring molten metal or alloy from the crucible and into an investment casting mold. Castings produced by this method have substantially less facecoat contamination and less alpha case than castings produced without using a delay period. Furthermore, the variability of casting contamination levels is substantially reduced by instituting a delay period.

EXAMPLE 5

This example concerns the production of a facecoat slurry, molds made having such facecoat, and Ti 6-4 step-wedge test bars cast using such molds to determine the effectiveness of inclusion imaging using the facecoat material, as well as the amount of alpha case produced by casting such test bars. As with Example 2, this example used a physical mixture of a refractory material, i.e., yttria, and an imaging agent, i.e., gadolinia, for the production of the facecoat slurry. Otherwise, the facecoat slurry and mold were produced in a manner substantially identical to that of Example 1. The materials used to produce the facecoat slurry are provided below in Table 6.

TABLE 6

| MATERIALS | WEIGHT PERCENT |
|---|---|
| deionized water | 4.10 |
| tetraethyl ammonium hydroxide | 1.00 |
| titanium dioxide | 4.00 |
| latex (Dow 460 NA) | 1.96 |
| surfactant (NOPCOWET C-50) | 0.21 |
| ludox SM (colloidal silica) | 7.80 |
| yttria | 78.58 |
| gadolinia | 2.25 |
| antifoaming agent (Dow 1410) | 0.10 |

Step-wedge test castings (1.5 inches; 1 inch; 0.5 inch; 0.25 inch and 0.125 inch) were cast from Ti 6-4 alloy metal using molds having a facecoat produced using the composition provided in Table 6. Alpha case test results for these step-wedge castings are provided below in Table 7. C indicates continuous alpha case while T indicates total alpha case.

TABLE 7

|  | 1.5" | | 1.0" | | 0.5" | | 0.25" | | 0.125" | |
|---|---|---|---|---|---|---|---|---|---|---|
| Face-coat | C | T | C | T | C | T | C | T | C | T |
| refractory flour is 100% yttria | 0.004 | 0.009 | 0.003 | 0.006 | 0.003 | 0.006 | 0.002 | 0.007 | 0.001 | 0.003 |
| refractory flour is yttria plus 2.25 wt. % gadolinia | 0.003 | 0.007 | 0.009 | 0.019 | 0.004 | 0.009 | 0.002 | 0.004 | 0.001 | 0.003 |

FIG. 1A is an N-ray image of a 2-inch-thick inclusion-containing test bar made having three facecoat-simulating inclusions sandwiched between two 1-inch thick plates, including one inclusion made from yttria and acting as a control where no inclusion is seen (the inclusion labeled "3" in FIG. 1A), and one inclusion labeled "aa" comprising a physical mixture of yttria and 2.25 weight percent (slurry basis)/2.58 weight percent (dry basis) gadolinia. The inclusion comprising the yttria-gadolinia imaging composition is clearly seen in FIG. 1A. Hence, FIG. 1A demonstrates that inclusions can be detected using N-ray imaging of castings made from molds comprising imaging agents physically mixed with other refractory materials according to the method of the present invention.

EXAMPLE 6

This example concerns the production of a facecoat slurry, molds made having such facecoat, and Ti 6-4 test bars cast using such molds to determine the effectiveness of inclusion imaging using the facecoat material, as well as the amount of alpha case produced by casting such test bars. As with Example 2, this example used a physical mixture of a refractory material, i.e., yttria, and an imaging agent, i.e., gadolinia, for the production of the facecoat slurry. Otherwise, the facecoat slurry and mold were produced in a manner substantially identical to that of Example 1. The materials used to produce the facecoat slurry are provided below in Table 8.

TABLE 8

| MATERIALS | WEIGHT PERCENT |
| --- | --- |
| deionized water | 3.84 |
| tetraethyl ammonium hydroxide | 0.94 |
| titanium dioxide | 3.75 |
| latex (Dow 460 NA) | 1.84 |
| surfactant (NOPCOWET C-50) | 0.20 |
| colloidal silica (Ludox SM) | 7.33 |
| yttria | 60.71 |
| gadolinia | 21.30 |
| antifoaming agent (Dow 1410) | 0.09 |

FIG. 1A is the N-ray image discussed above in Example 5 where the sample marked "ab" is an inclusion comprising a physical mixture of yttria and 21.30 weight percent (slurry basis)/25.97 weight percent (dry basis) gadolinia that was made using the facecoat slurry composition stated in Table 8. The inclusion made having 25.97 weight percent gadolinia is the inclusion most clearly seen in FIG. 1A. Hence, FIG. 1A not only demonstrates that facecoat inclusions in the interior of the titanium-alloy casting are readily detected using N-ray imaging and gadolinia imaging agents according to the method of the present invention, but further that the clarity of the N-ray image can be adjusted by the amount of the imaging agent used. This suggests that inclusions may be detected in castings having cross sections of greater than two inches by increasing the amount of imaging agent used. One possible method for determining the maximum amount of a particular imaging agent that can be used for forming a casting is to determine the amount of imaging agent that can be used to generally obtain a casting having a continuous α case of about 0.020 inch or less and a total alpha case of about 0.035 inch or less.

EXAMPLE 7

This example concerns the production of a facecoat slurry, molds made having such facecoat, and Ti 6-4 test bars cast using such molds to determine the effectiveness of inclusion imaging using the facecoat material, as well as the amount of alpha case produced by casting such test bars. As with Example 2, this example used a physical mixture of a refractory material, i.e., yttria, and an imaging agent, i.e., samaria, for the production of the facecoat slurry. Otherwise, the facecoat slurry and mold were produced in a manner substantially identical to that of Example 1. The materials used to produce the facecoat slurry are provided below in Table 9.

TABLE 9

| MATERIALS | WEIGHT PERCENT |
| --- | --- |
| deionized water | 4.04 |
| tetraethyl ammonium hydroxide | 0.97 |
| titanium dioxide | 3.85 |
| latex (Dow 460 NA) | 1.93 |
| surfactant (NOPCOWET C-50) | 0.21 |
| colloidal silica (Ludox SM) | 7.71 |
| yttria | 69.74 |

TABLE 9-continued

| MATERIALS | WEIGHT PERCENT |
| --- | --- |
| samaria | 11.45 |
| antifoaming agent (Dow 1410) | 0.1 |

Figure 1B:
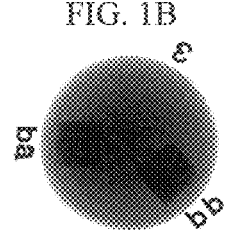
FIG. 1B is an N-ray image of an inclusion-containing test bar having three facecoat-simulating inclusions, where "ba" refers to a mixture of yttria and 13.11 weight percent samaria, "bb" refers to a mixture of yttria and 5.14 weight percent gadolinia, and "3" is a standard referring to 100 weight percent yttria.

FIG. 1B is an N-ray image of an inclusion-containing test bar having three facecoat-simulating inclusions. The inclusion in FIG. 1B marked "ba" comprised a physical mixture of yttria and 11.45 weight percent (slurry basis)/13.11 weight percent (dry basis) samaria that was made using the slurry composition of Table 9, and the inclusion marked "3" being yttria as a control. The inclusion made having 13.11 weight percent samaria clearly can be seen in FIG. 1B, indicating that samaria can be used as an imaging agent for N-ray imaging of inclusions according to the method of the present invention.

EXAMPLE 8

This example concerns the production of a facecoat slurry, molds made having such facecoat, and Ti 6-4 test bars cast using such molds to determine the effectiveness of inclusion imaging using the facecoat material, as well as the amount of alpha case produced by casting such test bars. As with Example 2, this example used a physical mixture of a refractory material, i.e., yttria, and an imaging agent, i.e., gadolinia, for the production of the facecoat slurry. Otherwise, the facecoat slurry and mold were produced in a manner substantially identical to that of Example 1. The materials used to produce the facecoat slurry are provided below in Table 10.

TABLE 10

| MATERIALS | WEIGHT PERCENT |
| --- | --- |
| deionized water | 4.06 |
| tetraethyl ammonium hydroxide | 0.99 |
| titanium dioxide | 3.97 |
| latex (Dow 460 NA) | 1.94 |
| surfactant (NOPCOWET C-50) | 0.21 |
| colloidal silica (Ludox SM) | 7.76 |
| yttria | 76.48 |
| gadolinia | 4.49 |
| antifoaming agent (Dow 1410) | 0.10 |

FIG. 1B is the N-ray image discussed in Example 7 where the inclusion marked "bb" comprises a physical mixture of yttria and 4.49 weight percent (slurry basis)/5.14 weight percent (dry basis) gadolinia made using the facecoat slurry composition stated in Table 10. Inclusion "bb", made having 5.14 weight percent gadolinia, is clearly seen in FIG. 1B, and is as distinguishable as inclusion "ba" in FIG. 1B made from the slurry having 11.95 weight percent samaria.

EXAMPLE 9

This example concerns the production of a facecoat slurry, molds made having such facecoat, and Ti 6-4 test bars cast using such molds to determine the effectiveness of inclusion imaging using the facecoat material, as well as the amount of alpha case produced by casting such test bars. As with Example 2, this example used a physical mixture of a refractory material, i.e., yttria, and an imaging agent, i.e., samaria, for the production of the facecoat slurry. Otherwise, the facecoat slurry and mold were produced in a manner substantially identical to that of Example 1. The materials used to produce the facecoat slurry are provided below in Table 11.

TABLE 11

| MATERIALS | WEIGHT PERCENT |
| --- | --- |
| deionized water | 3.52 |
| tetraethyl ammonium hydroxide | 0.85 |
| titanium dioxide | 3.36 |
| latex (Dow 460 NA) | 1.68 |
| surfactant (NOPCOWET C-50) | 0.18 |
| colloidal silica (Ludox SM) | 6.71 |
| yttria | 33.75 |
| samaria | 49.86 |
| antifoaming agent (Dow 1410) | 0.09 |

Figure 1C:
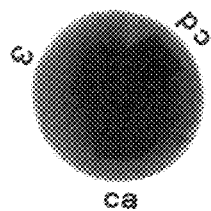
FIG. 1C is an N-ray image of an inclusion-containing test bar having three facecoat-simulating inclusions, where "ca" refers to a mixture of yttria and 56.03 weight percent samaria, "cd" refers to a mixture of yttria and 30.8 weight percent samaria, and "3" is a standard referring to 100 weight percent yttria.

FIG. 1C is an N-ray image of an inclusion-containing test bar having three facecoat-simulating inclusions. The inclusion in FIG. 1C marked "ca" comprised a physical mixture of yttria and 49.86 weight percent (slurry basis)/56.03 weight percent (dry basis) samaria that was made using the slurry composition of Table 11. The inclusion in FIG. 1C marked "3" is yttria, which was used as a control. The inclusion made having 56.03 weight percent samaria can be clearly seen as "ca" in FIG. 1C.

EXAMPLE 10

This example concerns the production of a facecoat slurry, molds made having such facecoat, and Ti 6-4 test bars cast using such molds to determine the effectiveness of inclusion imaging using the facecoat material, as well as the amount of alpha case produced by casting such test bars. As with Example 2, this example used a physical mixture of a refractory material, i.e., yttria, and an imaging agent, i.e., samaria, for the production of the facecoat slurry. Otherwise, the facecoat slurry and mold were produced in a manner substantially identical to that of Example 1. The materials used to produce the facecoat slurry are provided below in Table 12.

TABLE 12

| MATERIALS | WEIGHT PERCENT |
| --- | --- |
| deionized water | 3.83 |
| tetraethyl ammonium hydroxide | 0.92 |
| titanium dioxide | 3.65 |
| latex (Dow 460 NA) | 1.82 |
| surfactant (NOPCOWET C-50) | 0.20 |
| colloidal silica (Ludox SM) | 7.30 |
| yttria | 55.07 |
| samaria | 27.11 |
| antifoaming agent (Dow 1410) | 0.10 |

FIG. 1C is the N-ray image discussed in Example 9 where the inclusion marked "cd" comprises a physical mixture of yttria and 27.11 weight percent (slurry basis)/30.80 weight percent (dry basis) samaria made using the facecoat slurry composition stated in Table 12. The inclusion of labeled "cd", made having 30.8 weight percent samaria, is clearly seen in FIG. 1C.

EXAMPLE 11

This example concerns the production of facecoat slurries comprising an intimate mixture of a mold-forming material and an imaging agent, molds made having such facecoat, and Ti 6-4 test bars cast using such molds to determine the effectiveness of inclusion imaging using the facecoat material, as well as the amount of alpha case produced by casting such test bars at two different temperatures, namely 700° F. and 1800° F. This Example 11 concerns a facecoat slurry comprising an intimate mixture of calcined erbia/yttria. Otherwise, the facecoat slurry and mold were produced in a manner substantially identical to that of Example 1. The materials used to produce the facecoat slurry are provided below in Table 13.

TABLE 13

| MATERIALS | WEIGHT PERCENT |
| --- | --- |
| deionized water | 3.67 |
| tetraethyl ammonium hydroxide | 0.87 |
| titanium dioxide | 3.50 |
| latex (Dow 460 NA) | 1.75 |
| surfactant (NOPCOWET C-50) | 0.17 |
| colloidal silica (Ludox SM) | 6.99 |
| calcined erbia/yttria (36%/64%) | 82.96 |
| antifoaming agent (Dow 1410) | 0.09 |

Alpha case data is provided below in Table 14 for test bars cast at 1,800° F. and 700° F. using shells having the composition discussed in Example 11.

TABLE 14

| Face-coat | 1.5" | | 1.0" | | 0.5" | | 0.25" | | 0.125" | |
| --- | --- | --- | --- | --- | --- | --- | --- | --- | --- | --- |
| | C | T | C | T | C | T | C | T | C | T |
| Example 11 - 1800° F. | | | | | | | | | | |
| refractory flour was 100% yttria | 0.005 | 0.009 | 0.009 | 0.028 | 0.003 | 0.010 | 0.002 | 0.004 | 0.001 | 0.003 |
| refractory flour was yttria plus 36 wt. % erbia | 0.003 | 0.006 | 0.006 | 0.016 | 0.003 | 0.014 | 0.002 | 0.009 | 0.001 | 0.004 |
| Example 11 - 700° F. | | | | | | | | | | |
| refractory flour was 100% yttria | 0.002 | 0.006 | 0.002 | 0.004 | 0.002 | 0.007 | 0.002 | 0.005 | 0.001 | 0.003 |

TABLE 14-continued

|  | 1.5" | | 1.0" | | 0.5" | | 0.25" | | 0.125" | |
|---|---|---|---|---|---|---|---|---|---|---|
| Face-coat | C | T | C | T | C | T | C | T | C | T |
| refractory flour was yttria plus 36 wt. % erbia | 0.003 | 0.010 | 0.003 | 0.013 | 0.003 | 0.010 | 0.001 | 0.005 | 0.001 | 0.003 |

The alpha case data provided by Table 14 shows that parts cast using shells made as described in Example 11 had acceptable α case, i.e., less than about 0.020 inch continuous alpha case, and less than about 0.035 inch total alpha case. The alpha case data also shows, as would be expected, that reducing the mold temperature also reduces the amount of alpha case. This is best illustrated by comparing the total alpha case at the two different temperatures for castings of a particular thickness. For example, the 1 inch test bar had a total alpha case of about 0.016 inch at 1,800° F., and 0.013 inch at 700° F.

EXAMPLE 12

This example concerns the production of facecoat slurries comprising an intimate mixture of a mold-forming material and an imaging agent, molds made having such facecoat, and Ti 6-4 test bars cast using such molds to determine the effectiveness of inclusion imaging using the facecoat material, as well as the amount of alpha case produced by casting such test bars. This Example 12 concerns a facecoat slurry comprising calcined erbia/yttria. Otherwise, the facecoat slurry and mold were produced in a manner substantially identical to that of Example 1. The materials used to produce the facecoat slurry are provided below in Table 15.

TABLE 15

| MATERIALS | WEIGHT PERCENT |
|---|---|
| deionized water | 3.26 |
| tetraethyl ammonium hydroxide | 0.78 |
| titanium dioxide | 3.10 |
| latex (Dow 460 NA) | 1.55 |
| surfactant (NOPCOWET C-50) | 0.16 |
| colloidal silica (Ludox SM) | 6.20 |
| calcined erbia/yttria (63%/37%) | 84.88 |
| antifoaming agent (Dow 1410) | 0.07 |

Alpha case data at 1,800° F. and 700° F. for test bars made using shells having the composition discussed in Example 11 is provided below in Table 16.

TABLE 16

|  | 1.5" | | 1.0" | | 0.5" | | 0.25" | | 0.125" | |
|---|---|---|---|---|---|---|---|---|---|---|
| Face-coat | C | T | C | T | C | T | C | T | C | T |
| Example 12 - 1800° F. | | | | | | | | | | |
| refractory flour was 100% yttria | 0.004 | 0.009 | 0.004 | 0.005 | 0.002 | 0.009 | 0.004 | 0.010 | 0.003 | 0.009 |
| refractory flour was yttria plus 62 wt. % erbia | 0.004 | 0.007 | 0.004 | 0.009 | 0.003 | 0.009 | 0.004 | 0.012 | 0.001 | 0.003 |
| Example 12 - 700° F. | | | | | | | | | | |
| refractory flour was 100% yttria | 0.001 | 0.004 | 0.005 | 0.010 | 0.003 | 0.005 | 0.00 | 0.00 | 0.00 | 0.00 |
| Refractory flour was yttria plus 62 wt. % erbia | 0.001 | 0.003 | 0.002 | 0.008 | 0.002 | 0.002 | 0.00 | 0.00 | 0.003 | 0.010 |

Information provided by Table 16 shows that parts cast using shells made as described in Example 12 had acceptable alpha case, and that reducing the mold temperature also generally reduces the amount of alpha case.

EXAMPLE 13

This example concerns the production of facecoat slurries comprising an intimate mixture of a mold-forming material and an imaging agent, molds made having that facecoat, and Ti 6-4 test bars cast using such molds to determine the effectiveness of inclusion imaging using the facecoat material, as well as the amount of alpha case produced by casting such test bars. This Example 13 concerns a facecoat slurry comprising calcined dysprosia/yttria. Otherwise, the facecoat slurry and mold were produced in a manner substantially identical to that of Example 1. The materials used to produce the facecoat slurry are provided below in Table 17.

TABLE 17

| MATERIALS | WEIGHT PERCENT |
|---|---|
| deionized water | 3.60 |
| tetraethyl ammonium hydroxide | 0.86 |
| titanium dioxide | 3.43 |
| latex (Dow 460 NA) | 1.71 |
| surfactant (NOPCOWET C-50) | 0.17 |
| colloidal silica (Ludox SM) | 6.86 |
| calcined dysprosia/yttria (45%/55%) | 83.28 |
| antifoaming agent (Dow 1410) | 0.09 |

Figure 1D:
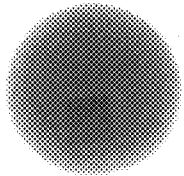
FIG. 1D is an N-ray image of an inclusion-containing test bar having a facecoat-simulating inclusion comprising cocalcined yttria and 45 weight percent dysprosia.

FIG. 1D is an N-ray image of a test bar made from a mold having the facecoat composition described above. FIG. 1D shows the presence of the inclusion.

Alpha case data at 1,800° F. and 700° F. for parts made using shells having the composition discussed in Example 13 is provided below in Table 18.

TABLE 18

| Face-coat | 1.5" | | 1.0" | | 0.5" | | 0.25" | | 0.125" | |
|---|---|---|---|---|---|---|---|---|---|---|
| | C | T | C | T | C | T | C | T | C | T |
| Example 13 - 1800° F. | | | | | | | | | | |
| refractory flour was 100% yttria | 0.006 | 0.009 | 0.003 | 0.007 | 0.001 | 0.004 | 0.001 | 0.003 | <0.001 | 0.002 |
| refractory flour was yttria plus 45 wt. % dysprosia | 0.004 | 0.006 | 0.012 | 0.032 | 0.003 | 0.014 | 0.003 | 0.010 | <0.001 | 0.002 |
| Example 13 - 700° F. | | | | | | | | | | |
| refractory flour was 100% yttria | 0.003 | 0.004 | 0.003 | 0.014 | 0.001 | 0.004 | 0.001 | 0.002 | 0.001 | 0.001 |
| refractory flour was yttria plus 45 wt. % dysprosia | 0.003 | 0.005 | 0.002 | 0.004 | 0.003 | 0.010 | 0.001 | 0.004 | 0.001 | 0.004 | slurry comprising calcined dysprosia/yttria. Otherwise, the facecoat slurry and mold were produced in a manner substantially identical to that of Example 1. The materials used to produce the facecoat slurry are provided below in Table 19.

TABLE 19

| MATERIALS | WEIGHT PERCENT |
|---|---|
| deionized water | 3.35 |
| tetraethyl ammonium hydroxide | 0.80 |
| titanium dioxide | 3.19 |
| latex (Dow 460 NA) | 1.59 |
| surfactant (NOPCOWET C-50) | 0.16 |
| colloidal silica (Ludox SM) | 6.38 |
| calcined dysprosia/yttria (62%/38%) | 84.46 |
| antifoaming agent (Dow 1410) | 0.07 |

EXAMPLE 14

Figure 1E:
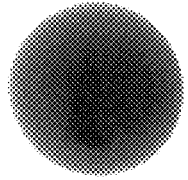
FIG. 1E is an N-ray image of an inclusion-containing test bar having a facecoat-simulating inclusion comprising cocalcined yttria and 62 weight percent dysprosia.

This example concerns the production of facecoat slurries comprising an intimate mixture of a mold-forming material and an imaging agent, molds made using such facecoat, and Ti 6-4 test bars cast using such molds to determine the effectiveness of inclusion imaging using the facecoat material, as well as the amount of alpha case produced by casting such test bars. This Example 14 concerns a facecoat FIG. 1E is an N-ray image of a test bar made from a mold having the facecoat composition described above. FIG. 1E shows the presence of the inclusion.

Alpha case data for test bars cast using shell temperatures of 1,800° F. and 700° F. and using shells having the composition discussed in Example 14 is provided below in Table 20.

TABLE 20

| Face-coat | 1.5" | | 1.0" | | 0.5" | | 0.25" | | 0.125" | |
|---|---|---|---|---|---|---|---|---|---|---|
| | C | T | C | T | C | T | C | T | C | T |
| Example 14 - 1800° F. | | | | | | | | | | |
| refractory flour was 100% yttria | 0.004 | 0.007 | 0.006 | 0.020 | 0.001 | 0.005 | 0.002 | 0.009 | <0.001 | 0.003 |
| refractory flour was yttria plus 62 wt. % dysprosia | 0.004 | 0.007 | 0.008 | 0.027 | 0.002 | 0.007 | 0.002 | 0.010 | 0.001 | 0.004 |
| Example 14 - 700° F. | | | | | | | | | | |
| refractory flour was 100% yttria | 0.002 | 0.004 | 0.002 | 0.004 | 0.001 | 0.004 | 0.001 | 0.003 | <0.001 | <0.001 |
| refractory flour was yttria plus 62 wt. % dysprosia | 0.003 | 0.005 | 0.003 | 0.011 | 0.002 | 0.005 | <0.001 | 0.004 | <0.001 | <0.001 |

EXAMPLE 15

This example concerns the production of facecoat slurries comprising an intimate mixture of a mold-forming material and an imaging agent, molds made having such facecoat, and Ti 6-4 test bars cast using such molds to determine the effectiveness of inclusion imaging using the facecoat material, as well as the amount of alpha case produced by casting such test bars. This Example 15 concerns a facecoat slurry comprising calcined gadolinia/yttria. Otherwise, the facecoat slurry and mold were produced in a manner substantially identical to that of Example 1. The materials used to produce the facecoat slurry are provided below in Table 21.

TABLE 21

| MATERIALS | WEIGHT PERCENT |
| --- | --- |
| deionized water | 4.19 |
| tetraethyl ammonium hydroxide | 1.00 |

TABLE 21-continued

| MATERIALS | WEIGHT PERCENT |
| --- | --- |
| titanium dioxide | 3.99 |
| latex (Dow 460 NA) | 1.99 |
| surfactant (NOPCOWET C-50) | 0.20 |
| colloidal silica (Ludox SM) | 7.97 |
| calcined gadolinia/yttria (01%/99%) | 80.56 |
| antifoaming agent (Dow 1410) | 0.10 |

Figure 1F:
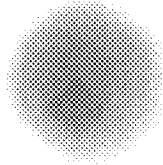
FIG. 1F is an N-ray image of an inclusion-containing test bar having a facecoat-simulating inclusion comprising cocalcined yttria and 1 weight percent dysprosia.

FIG. 1F is an N-ray image of a test bar made from a mold having the facecoat composition described above. FIG. 1F shows the presence of the inclusion.

Alpha case data for test bars cast using shells having the composition discussed in Example 15 is provided below in Table 22.

TABLE 22

| Face-coat | 1.5" | | 1.0" | | 0.5" | | 0.25" | | 0.125" | |
| --- | --- | --- | --- | --- | --- | --- | --- | --- | --- | --- |
| | C | T | C | T | C | T | C | T | C | T |
| Example 15 - 1800° F. | | | | | | | | | | |
| refractory flour was 100% yttria | 0.005 | 0.009 | 0.003 | 0.006 | 0.009 | 0.028 | 0.002 | 0.003 | 0.00 | 0.00 |
| refractory flour was yttria plus 1 wt. % gadolinia | 0.007 | 0.012 | 0.002 | 0.005 | 0.003 | 0.007 | 0.002 | 0.003 | 0.00 | 0.00 |
| Example 15 - 700° F. | | | | | | | | | | |
| refractory flour was 100% yttria | 0.002 | 0.005 | 0.001 | 0.003 | 0.00 | 0.00 | 0.00 | 0.00 | 0.00 | 0.00 |
| refractory flour was yttria plus 1 wt. % gadolinia | 0.002 | 0.003 | 0.002 | 0.003 | 0.00 | 0.00 | 0.00 | 0.00 | 0.00 | 0.00 |

EXAMPLE 16

This example concerns the production of facecoat slurries comprising an intimate mixture of a mold-forming material and an imaging agent, molds made using such facecoat, and Ti 6-4 test bars cast using such molds to determine the effectiveness of inclusion imaging using the facecoat material, as well as the amount of alpha case produced by casting such test bars. This Example 16 concerns a facecoat slurry comprising calcined gadolinia/yttria. Otherwise, the facecoat slurry and mold were produced in a manner substantially identical to that of Example 1. The materials used to produce the facecoat slurry are provided below in Table 23.

TABLE 23

| MATERIALS | WEIGHT PERCENT |
| --- | --- |
| deionized water | 4.04 |
| tetraethyl ammonium hydroxide | 0.96 |
| titanium dioxide | 3.85 |
| latex (Dow 460 NA) | 1.93 |
| surfactant (NOPCOWET C-50) | 0.19 |
| colloidal silica (Ludox SM) | 7.70 |
| calcined gadolinia/yttria (14%/86%) | 81.22 |
| antifoaming agent (Dow 1410) | 0.14 |

Figure 2G:
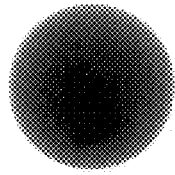
FIG. 2G is an N-ray image of an inclusion-containing test bar having a facecoat-simulating inclusion comprising cocalcined yttria and 14 weight percent gadolinia.

FIG. 2G is an N-ray image of a test bar made from a mold having the facecoat composition described above. FIG. 2G shows the presence of the inclusion.

Alpha case data for test bars cast as discussed in Example 16 is provided below in Table 24.

TABLE 24

| Face-coat | 1.5" | | 1.0" | | 0.5" | | 0.25" | | 0.125" | |
|---|---|---|---|---|---|---|---|---|---|---|
| | C | T | C | T | C | T | C | T | C | T |
| Example 16 - 1800° F. | | | | | | | | | | |
| Refractory flour was 100% yttria | 0.005 | 0.009 | 0.005 | 0.009 | 0.005 | 0.010 | 0.002 | 0.003 | 0.001 | 0.004 |
| Refractory flour was yttria plus 14 wt. % gadolinia | 0.005 | 0.009 | 0.004 | 0.011 | 0.002 | 0.005 | 0.002 | 0.005 | 0.00 | 0.00 |
| Example 16 - 700° F. | | | | | | | | | | |
| Refractory flour was 100% yttria | 0.003 | 0.007 | 0.003 | 0.005 | 0.001 | 0.003 | 0.00 | 0.00 | 0.00 | 0.00 |
| Refractory flour was yttria plus 14 wt. % gadolinia | 0.003 | 0.004 | 0.001 | 0.005 | 0.00 | 0.00 | 0.00 | 0.00 | 0.00 | 0.00 |

EXAMPLE 17

This example concerns the production of facecoat slurries comprising an intimate mixture of a mold-forming material and an imaging agent, molds that have been made using such facecoat, and Ti 6-4 test bars cast using such molds to determine the effectiveness of inclusion imaging using the facecoat material, as well as the amount of alpha case produced by casting such test bars. This Example 17 concerns a facecoat slurry comprising calcined gadolinia/yttria. Otherwise, the facecoat slurry and mold were produced in a manner substantially identical to that of Example 1. The materials used to produce the facecoat slurry are provided below in Table 25.

TABLE 25

| MATERIALS | WEIGHT PERCENT |
|---|---|
| deionized water | 3.53 |
| tetraethyl ammonium hydroxide | 0.84 |
| titanium dioxide | 3.36 |
| latex (Dow 460 NA) | 1.68 |
| surfactant (NOPCOWET C-50) | 0.17 |
| colloidal silica (Ludox SM) | 6.72 |
| calcined gadolinia/yttria (60%/40%) | 83.62 |
| antifoaming agent (Dow 1410) | 0.08 |

Figure 2H:
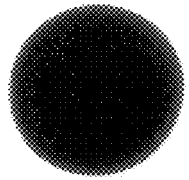
FIG. 2H is an N-ray image of an inclusion-containing test bar having a facecoat-simulating inclusion comprising cocalcined yttria and 60 weight percent gadolinia.

FIG. 2H is an N-ray image of a test bar made from a mold having the facecoat composition described above. FIG. 2H shows the presence of the inclusion.

Alpha case data for test bars cast as discussed in Example 17 is provided below in Table 26.

TABLE 26

| Face-coat | 1.5" | | 1.0" | | 0.5" | | 0.25" | | 0.125" | |
|---|---|---|---|---|---|---|---|---|---|---|
| | C | T | C | T | C | T | C | T | C | T |
| Example 17 - 1800° F. | | | | | | | | | | |
| refractory flour was 100% yttria | 0.004 | 0.008 | 0.004 | 0.007 | 0.003 | 0.007 | 0.001 | 0.003 | 0.0 | 0.00 |
| refractory flour was yttria plus 60 wt. % gadolinia | 0.012 | 0.014 | 0.005 | 0.010 | 0.003 | 0.007 | 0.001 | 0.004 | 0.00 | 0.00 |

TABLE 26-continued

| Face-coat | 1.5" | | 1.0" | | 0.5" | | 0.25" | | 0.125" | |
|---|---|---|---|---|---|---|---|---|---|---|
| | C | T | C | T | C | T | C | T | C | T |
| Example 17 - 700° F. | | | | | | | | | | |
| refractory flour was 100% yttria | 0.005 | 0.009 | 0.002 | 0.007 | 0.002 | 0.007 | 0.002 | 0.004 | 0.00 | 0.00 |
| refractory flour was yttria plus 60 wt. % gadolinia | 0.004 | 0.006 | 0.002 | 0.003 | 0.003 | 0.003 | 0.002 | 0.003 | 0.00 | 0.00 |

EXAMPLE 18

This example concerns producing facecoat slurries comprising gadolinia as both the mold-forming material and the imaging agent and molds having such facecoat. The facecoat slurry and mold are produced in a manner substantially identical to that of Example 1. The materials for producing the facecoat slurry are provided below in Table 27.

TABLE 27

| MATERIALS | WEIGHT PERCENT |
|---|---|
| deionized water | 3.04 |
| tetraethyl ammonium hydroxide | 0.72 |
| titanium dioxide | 2.90 |
| latex (Dow 460 NA) | 1.45 |
| surfactant (NOPCOWET C-50) | 0.14 |
| colloidal silica (Ludox SM_ | 5.79 |
| gadolinia (100%) | 85.88 |
| antifoaming agent (Dow 1410) | 0.08 |

Molds produced according to this Example 18 are not deemed suitable for casting parts. This apparently is due to the increased aqueous solubility of gadolinia relative to yttria. The problems encountered with this Example 18 however, likely can be addressed by taking into consideration the enhanced aqueous solubility of pure gadolinia as compared to other imaging materials, and mixtures of mold-forming agents and imaging agents.

EXAMPLE 19

This example concerns the production of facecoat slurries comprising an intimate mixture of a mold-forming material and an imaging agent, molds made using such facecoat, and Ti 6-4 test bars cast using such molds to determine the effectiveness of inclusion imaging using the facecoat material, as well as the amount of alpha case produced by casting such test bars. This Example 19 concerns a facecoat slurry comprising calcined samaria/yttria. Otherwise, the facecoat slurry and mold were produced in a manner substantially identical to that of Example 1. The materials used to produce the facecoat slurry are provided below in Table 28.

TABLE 28

| MATERIALS | WEIGHT PERCENT |
|---|---|
| deionized water | 4.04 |
| tetraethyl ammonium hydroxide | 0.96 |
| titanium dioxide | 3.85 |
| latex (Dow 460 NA) | 1.93 |
| surfactant (NOPCOWET C-50) | 0.19 |
| colloidal silica (Ludox SM) | 7.70 |
| calcined samaria/yttria (14%/86%) | 81.22 |
| antifoaming agent (Dow 1410) | 0.11 |

Figure 2I:
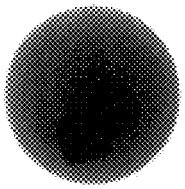
FIG. 2I is an N-ray image of an inclusion-containing test bar having a facecoat-simulating inclusion comprising cocalcined yttria and 14 weight percent samaria.

FIG. 2I is an N-ray image of a test bar made from a mold having the facecoat composition described above. FIG. 2I shows the presence of the inclusion.

Alpha case data for test bars cast at shell temperatures of 1,800° F. and 700° F. using shells made from the composition discussed in Example 19 is provided below in Table 29.

TABLE 29

| Face-coat | 1.5" | | 1.0" | | 0.5" | | 0.25" | | 0.125" | |
|---|---|---|---|---|---|---|---|---|---|---|
| | C | T | C | T | C | T | C | T | C | T |
| Example 19 - 1800° F. | | | | | | | | | | |
| refractory flour was 100% yttria | 0.004 | 0.010 | 0.006 | 0.019 | 0.003 | 0.014 | 0.002 | 0.012 | <0.001 | 0.002 |
| refractory flour was yttria plus 14 wt. % samaria | 0.003 | 0.005 | 0.006 | 0.019 | 0.003 | 0.012 | 0.002 | 0.005 | 0.001 | 0.004 |
| Example 19 - 700° F. | | | | | | | | | | |
| refractory flour was 100% yttria | 0.003 | 0.007 | 0.004 | 0.007 | 0.003 | 0.004 | 0.002 | 0.005 | <0.001 | 0.001 |
| refractory flour was yttria plus 14 wt. % samaria | 0.003 | 0.012 | 0.003 | 0.006 | 0.003 | 0.012 | <0.001 | 0.004 | <0.001 | <0.001 |

EXAMPLE 20

This example concerns the production of facecoat slurries comprising an intimate mixture of a mold-forming material and an imaging agent, molds that have been made using such facecoat, and Ti 6-4 test bars cast using such molds to determine the effectiveness of inclusion imaging using the facecoat material, as well as the amount of alpha case produced by casting such test bars. This Example 20 concerns a facecoat slurry comprising calcined samaria/yttria. Otherwise, the facecoat slurry and mold were produced in a manner substantially identical to that of Example 1. The materials used to produce the facecoat slurry are provided below in Table 30.

TABLE 30

| MATERIALS | WEIGHT PERCENT |
| --- | --- |
| deionized water | 3.90 |
| tetraethyl ammonium hydroxide | 0.93 |
| titanium dioxide | 3.71 |
| latex (Dow 460 NA) | 1.86 |
| surfactant (NOPCOWET C-50) | 0.19 |
| colloidal silica (Ludox SM) | 7.43 |
| calcined samaria/yttria (27%/73%) | 81.89 |
| antifoaming agent (Dow 1410) | 0.09 |

Figure 2J:
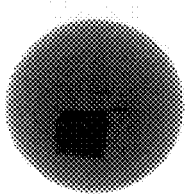
FIG. 2J is an N-ray image of an inclusion-containing test bar having a facecoat-simulating inclusion comprising cocalcined yttria and 27 weight percent samaria.

FIG. 2J is an N-ray image of a test bar made from a mold having the facecoat composition described above. FIG. 2J shows the presence of the inclusion.

Alpha case data for test bars cast as discussed in Example 20 is provided below in Table 31.

TABLE 31

| Face-coat | 1.5" | | 1.0" | | 0.5" | | 0.25" | | 0.125" | |
| --- | --- | --- | --- | --- | --- | --- | --- | --- | --- | --- |
| | C | T | C | T | C | T | C | T | C | T |
| Example 20 - 1800° F. | | | | | | | | | | |
| refractory flour was 100% yttria | 0.005 | 0.010 | 0.004 | 0.005 | 0.003 | 0.005 | 0.002 | 0.005 | 0.001 | 0.00 |
| refractory flour was yttria plus 27 wt. % samaria | 0.003 | 0.005 | 0.005 | 0.010 | 0.003 | 0.016 | 0.003 | 0.009 | 0.00 | 0.00 |
| Example 20 - 700° F. | | | | | | | | | | |
| refractory flour was 100% yttria | 0.003 | 0.005 | 0.004 | 0.021 | 0.002 | 0.005 | 0.001 | 0.003 | 0.001 | 0.002 |
| refractory flour was yttria plus 27 wt. % samaria | 0.003 | 0.009 | 0.003 | 0.005 | 0.002 | 0.011 | <0.001 | 0.004 | <0.001 | 0.003 |

EXAMPLE 21

This example concerns the production of facecoat slurries comprising an intimate mixture of a mold-forming material and an imaging agent, molds made having such facecoat, and Ti 6-4 test bars cast using such molds to determine the effectiveness of inclusion imaging using the facecoat material, as well as the amount of alpha case produced by casting such test bars. This Example 21 concerns a facecoat slurry comprising calcined gadolinia/yttria. Otherwise, the facecoat slurry and mold were produced in a manner substantially identical to that of Example 1. The materials used to produce the facecoat slurry are provided below in Table 32.

TABLE 32

| MATERIALS | WEIGHT PERCENT |
| --- | --- |
| deionized water | 3.90 |
| tetraethyl ammonium hydroxide | 0.93 |
| titanium dioxide | 3.71 |
| latex (Dow 460 NA) | 1.86 |
| surfactant (NOPCOWET C-50) | 0.19 |
| colloidal silica (Ludox SM) | 7.43 |
| calcined gadolinia/yttria (27%/73%) | 81.89 |
| antifoaming agent (Dow 1410) | 0.09 |

Figure 2K:
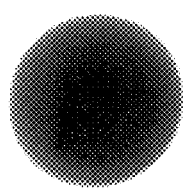
FIG. 2K is an N-ray image of an inclusion-containing test bar having a facecoat-simulating inclusion comprising cocalcined yttria and 27 weight percent gadolinia.

FIG. 2K is an N-ray image of a test bar made from a mold having the facecoat composition described above. FIG. 2K shows the presence of the inclusion.

EXAMPLE 22

This example concerns the production of facecoat slurries comprising an intimate mixture of a mold-forming material and an imaging agent, molds that have been cast using such facecoat, and Ti 6-4 test bars cast using such molds to determine the effectiveness of inclusion imaging using the facecoat material, as well as the amount of alpha case produced by casting such test bars. This Example 22 concerns a facecoat slurry comprising calcined gadolinia/yttria. Otherwise, the facecoat slurry and mold were produced in a manner substantially identical to that of Example 1. The materials used to produce the facecoat slurry are provided below in Table 33.

TABLE 33

| MATERIALS | WEIGHT PERCENT |
| --- | --- |
| deionized water | 3.77 |
| tetraethyl ammonium hydroxide | 0.90 |
| titanium dioxide | 3.59 |
| latex (Dow 460 NA) | 1.80 |
| surfactant (NOPCOWET C-50) | 0.18 |
| colloidal silica (Ludox SM) | 7.18 |
| calcined gadolinia/yttria (39%/61%) | 82.49 |
| Antifoaming agent (Dow 1410) | 0.09 |

Figure 2L:
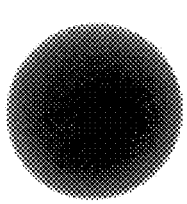
FIG. 2L is an N-ray image of an inclusion-containing test bar having a facecoat-simulating inclusion comprising cocalcined yttria and 39 weight percent gadolinia.

FIG. 2L is an N-ray image of a test bar made from a mold having the facecoat composition described above. FIG. 2L shows the presence of the inclusion.

EXAMPLE 23

This example concerns the production of facecoat slurries comprising an intimate mixture of a mold-forming material and an imaging agent, molds made having such facecoat, and Ti 6-4 structural castings made using such molds to determine the effectiveness of inclusion imaging agents using the facecoat material, as well as the amount of α case produced by casting such a part. This Example 23 concerns a facecoat slurry comprising calcined gadolinia/yttria. Otherwise, the facecoat slurry and molds were produced in a manner substantially identical to that of Example 1. The materials used to produce the facecoat slurry are provided in Table 23. Alpha case results from four locations are shown in Table 34.

TABLE 34

| Location | C | T |
|---|---|---|
| 1 | 0.004 | 0.004 |
| 2 | 0.002 | 0.006 |
| 3 | 0.004 | 0.006 |
| 4 | 0.008 | 0.015 |

Figure 3:
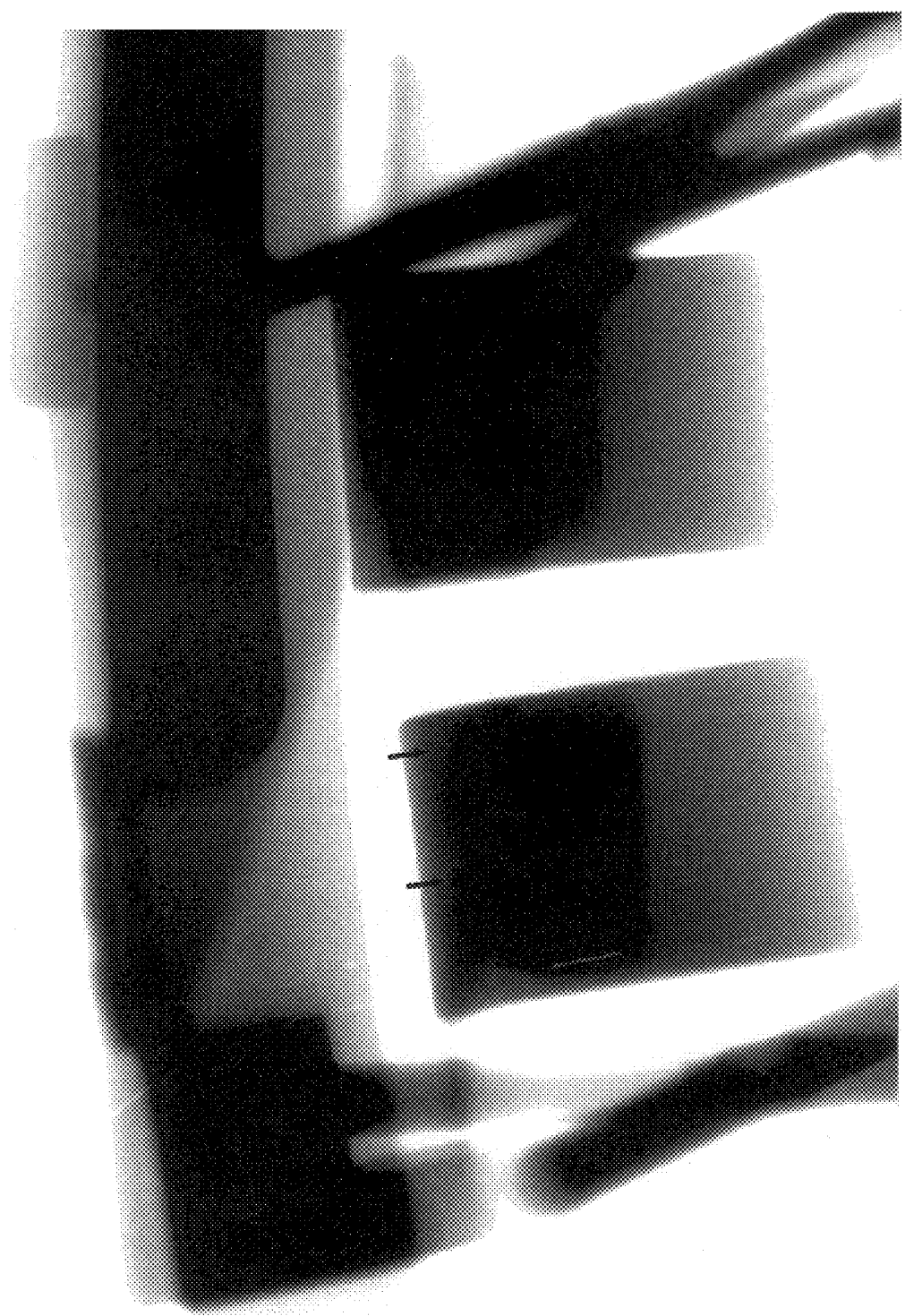
FIG. 3 is an N-ray image of an experimental casting made using a mold having a facecoat comprising yttria and 14 weight percent gadolinia.

Non-destructive testing using N-ray analysis revealed the presence of two inclusions (FIG. 3) in a section thickness of about 1 inch, the inclusions having observed lengths of about 0.025 inch and 0.050 inch. Standard production techniques for inspection using both X-ray analysis and ultrasonic inspection did not reveal these inclusions. This example therefore demonstrates (1) the ability of the gadolinia-doped facecoat to produce castings having acceptable alpha case levels, and (2) the benefits of using N-ray analysis to detect inclusions, which otherwise would go undetected using conventional techniques developed prior to the present invention.

EXAMPLE 24

This example concerns the production of facecoat slurries comprising an intimate mixture of a mold-forming material and an imaging agent, molds made using such facecoat, and Ti 6-4 parts cast using such molds to determine the effectiveness of inclusion imaging using the facecoat material, as well as the amount of alpha case produced by casting such test bars. This Example 24 concerns a facecoat slurry comprising calcined gadolinia/yttria. Otherwise, the facecoat slurry and mold were produced in a manner substantially identical to that of Example 1. The materials used to produce the facecoat slurry are provided below in Table 35.

TABLE 35

| MATERIALS | WEIGHT PERCENT |
|---|---|
| deionized water | 4.04 |
| tetraethyl ammonium hydroxide | 0.96 |
| titanium dioxide | 3.85 |
| latex (Dow 460 NA) | 1.93 |
| surfactant (NOPCOWET C-50) | 0.19 |
| colloidal silica (Ludox SM) | 7.70 |
| calcined gadolinia/yttria (14%/86%) | 81.22 |
| antifoaming agent (Dow 1410) | 0.14 |

FIG. 2G is an N-ray image of a test bar made from a mold having the facecoat composition described above. FIG. 2G shows the presence of the inclusion.

Alpha case data for test bars cast as discussed in Example 16 is provided below in Table 36.

TABLE 36

| | Example 24 - 1800° F. | | | | | | | | | |
|---|---|---|---|---|---|---|---|---|---|---|
| | 1.5" | | 1.0" | | 0.5" | | 0.25" | | 0.125" | |
| Face-coat | C | T | C | T | C | T | C | T | C | T |
| Refractory flour is 100% yttria | 0.005 | 0.009 | 0.005 | 0.009 | 0.005 | 0.010 | 0.002 | 0.003 | 0.001 | 0.004 |
| Refractory flour is yttria plus 14 wt. % gadolinia | 0.005 | 0.009 | 0.004 | 0.011 | 0.002 | 0.005 | 0.002 | 0.005 | 0.00 | 0.00 |

EXAMPLE 25

This example concerns the production of facecoat slurries comprising an intimate mixture of a mold-forming material and an imaging agent, molds made using such facecoat, and Ti 6-4 developmental parts that were cast using such molds to determine the effectiveness of inclusion imaging using the facecoat material, as well as the amount of alpha case produced by casting such parts. This Example 25 concerns a facecoat slurry comprising calcined gadolinia/yttria. Otherwise, the facecoat slurry and mold were produced in a manner substantially identical to that of Example 1. The materials used to produce the facecoat slurry are provided below in Table 37. The molds were heated to 1800° F. prior to pouring.

TABLE 37

| MATERIALS | WEIGHT PERCENT |
|---|---|
| deionized water | 4.04 |
| Tetraethyl ammonium hydroxide | 0.96 |
| titanium dioxide | 3.85 |
| latex (Dow 460 NA) | 1.93 |
| surfactant (NOPCOWET C-50) | 0.19 |
| colloidal silica (Ludox SM) | 7.70 |
| calcined gadolinia/yttria (14%/86%) | 81.22 |
| antifoaming agent (Dow 1410) | 0.14 |

TABLE 38

PRODUCTION PART ALPHA CASE COMPARISON FOR PURE YTTRIA FACECOATS VS. FACECOATS COMPRISING YTTRIA AND 14 WEIGHT PERCENT GADOLINIA

| | YTTRIA FACECOAT | | YTTRIA + GADOLINIA FACECOAT | |
|---|---|---|---|---|
| Location | | Alpha case Thickness (in.) | | Alpha case Thickness (in.) |
| 1 | Continuous | 0.010 | Continuous | 0.004 |
|   | Total | 0.013 | Total | 0.010 |
| 2 | Continuous | 0.008 | Continuous | 0.004 |
|   | Total | 0.018 | Total | 0.011 |
| 3 | Continuous | 0.003 | Continuous | 0.002 |
|   | Total | 0.005 | Total | 0.005 |
| 4 | Continuous | 0.006 | Continuous | 0.002 |
|   | Total | 0.009 | Total | 0.008 |
| 5 | Continuous | 0.006 | Continuous | 0.004 |
|   | Total | 0.017 | Total | 0.010 |
| 6 | Continuous | 0.008 | Continuous | 0.005 |
|   | Total | 0.020 | Total | 0.011 |
| 7 | Continuous | 0.006 | Continuous | 0.002 |
|   | Total | 0.011 | Total | 0.006 |
| 8 | Continuous | 0.005 | Continuous | 0.002 |
|   | Total | 0.012 | Total | 0.007 |

Table 38 compares the amount of alpha case in production parts cast using molds comprising gadolinia imaging agent to the same parts cast using yttria, a known facecoat material particularly useful for investment casting titanium and titanium alloy parts. A person skilled in the art of investment casting might conclude that the addition of imaging agent to a yttria facecoat would increase the amount of alpha case. Surprisingly, little detrimental effects have been demonstrated with respect to substituting imaging agent for known facecoat materials and the quality of the part shown.

Figure 4:
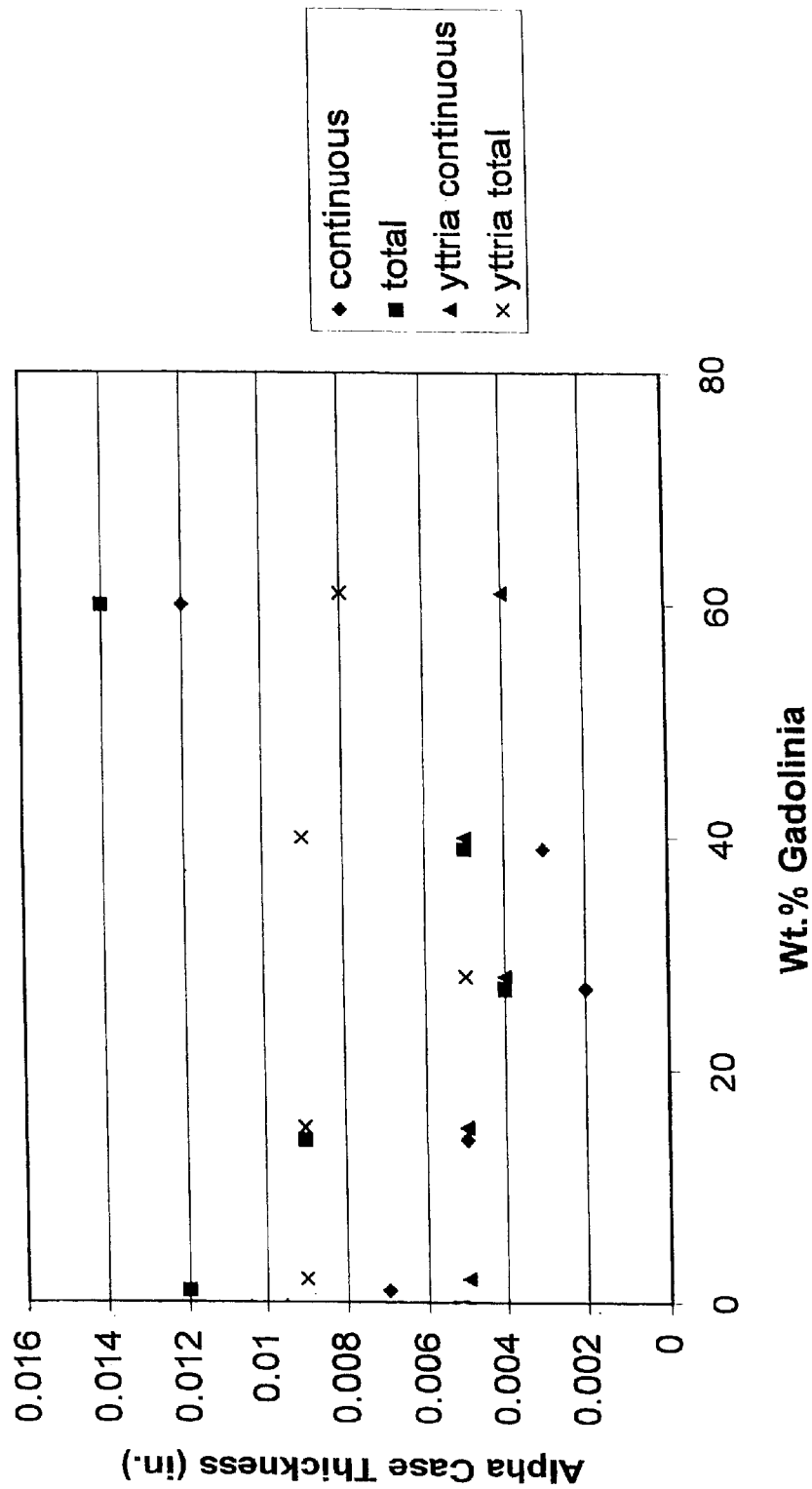
FIG. 4 is a graph of weight percent gadolinia imaging agent versus alpha case (thickness in inches) for a production part made having a cross sectional thickness of 1.5 inches.
Figure 5:
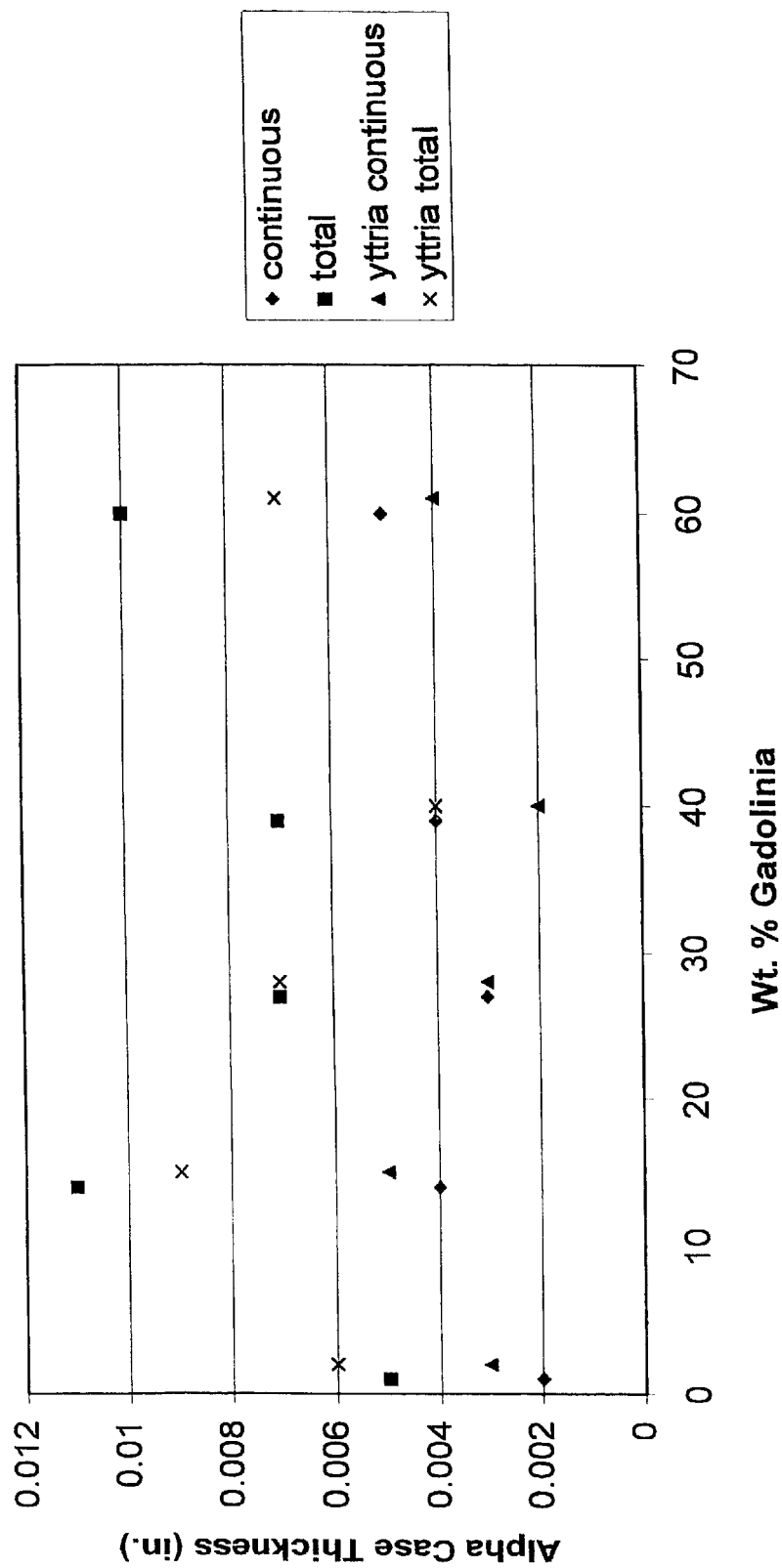
FIG. 5 is a graph of weight percent gadolinia imaging agent versus alpha case (thickness in inches) for a production part made having a cross sectional thickness of 1.0 inch.

FIGS. 4 and 5 are graphs of alpha case thickness, in inches, for production parts cast having cross sectional thicknesses of 1.5 inches and 1.0 inch, respectively. Surprisingly, FIG. 4 shows that as the percent gadolinia increases from an initial amount of about 1% to between about 20% and 40% the alpha case decreases. As stated above, this is unexpected as a person of ordinary skill in the art likely would expect that increasing the percent imaging agent would increase the alpha case. The data plotted on FIG. 5 supports the conclusion that, at least for parts having a cross sectional thickness of 1 inch or greater, substituting imaging agent does not seem to increase the alpha case. For parts having cross sectional thicknesses of 1 inch or greater, increasing the percent of gadolinia imaging agent up to about 40 weight percent has the positive effect of decreasing the alpha case relative to parts made using molds having pure yttria facecoats.

EXAMPLE 26

This example concerns the real-time analysis and detectability of inclusions by N-ray analysis. For this example, Ti 6-4 material having a 0.25 inch cross sectional thickness was obtained. Samples of this material were stacked in 0.25 inch increments from 0.25 inch up to 4 inches. Flakes of facecoat material 0.007 inch thick and of varying cross sectional area were placed on top of the stack. For each thickness of titanium, an N-ray film was obtained. Moreover, for each thickness, a real-time image was obtained having 1024 frames of data, and then such data was integrated to provide an electronic image. The film and electronic images were then compared to determine the sensitivity of the real time imaging relative to the film imaging method.

Figure 6:
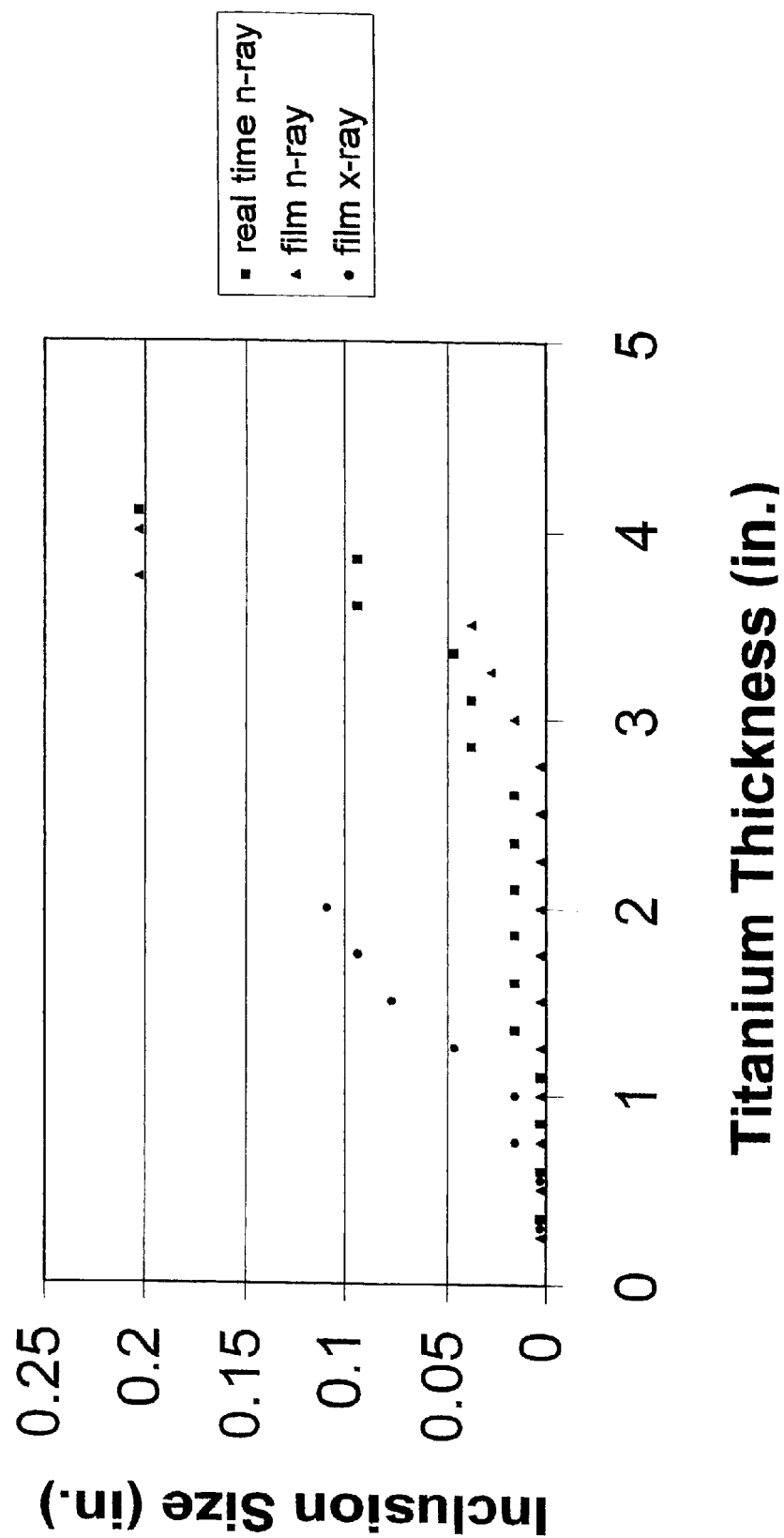
FIG. 6 is an inclusion detectability graph of cross-sectional thickness in a titanium casting versus inclusion size detected for real time N-ray analysis versus film imaging for N-ray and X-ray analysis.

With reference to FIG. 6, the smallest inclusion that was detected by both film and real time for a part having a cross sectional thickness of less than one inch was an 0.007-inch thick flake having a length of 0.003 inch. For titanium thicknesses of about 1.25 inches, the minimum thickness for N-ray film is still a 0.007-inch thick flake having a length of 0.003 inch. For real time N-ray imaging the inclusion size that can be imaged increased to about 0.007-inch thick inclusions having a length of 0.016 inch. Thus, the minimum inclusion size that can be seen in real time for a titanium part having a thickness of about 1.25 inch has increased relative to that of parts having smaller cross sectional thicknesses, but only from about 0.003 inch to about 0.016 inch. This holds true for parts having cross sectional thicknesses of up to about 2.5 inches in cross section. For parts having cross sectional thicknesses of 2.75 inches, N-ray film can still detect 0.007-inch thick flakes having a length of 0.003 inch, whereas real time analysis can detect a 0.007-inch thick inclusions having a length of 0.038 inch. FIG. 6 demonstrates that real time N-ray analysis is sufficiently capable of imaging inclusions that it can be used instead of film recording for detecting inclusions. Moreover, FIG. 6 shows that both real time and film recording N-ray techniques are much more sensitive than X-ray techniques for imaging inclusions in titanium castings.

IV. Infiltration Method for Forming Molds Comprising Imaging Agents

The method described above involves forming a mold having at least a facecoat that includes one or more imaging agents. An alternative method for forming investment casting molds comprising imaging agents might be to first form a mold substantially as described above, and thereafter infiltrate the mold with a suitable imaging agent. In this method all particles, including stucco would be coated with the imaging agent.

One method for infiltrating the mold would be to form the mold in the conventional manner to have an internal cavity in the shape of the desired article. A solution, typically but not necessarily an aqueous solution, of an imaging agent would then be placed inside the cavity for a sufficient period of time to substantially uniformly infiltrate the desired portion of the mold. For example, a solution of a gadolinium salt, such as a nitrate, sulfate or halide salt, would be placed inside the cavity.

A second method for infiltrating the mold would be to immerse a pattern having at least a facecoat applied thereto into an aqueous or non-aqueous solution comprising an imaging agent to infiltrate at least the facecoat with the imaging agent. The pattern could be immersed in imaging agent solutions after application of only the facecoat, after application of the facecoat and then again after application of at least one backup layer, after the facecoat and then again plural times after each application of subsequent backup layers, or after application of each and every layer of the mold. The infiltration process is facilitated by using a vacuum chamber to at least partially evacuate the pores of the mold, thereby allowing imaging agent solution enter such pores. Infiltrating molds is described in more detail in U.S. Pat. No. 5,927,379, which is incorporated herein by reference.

The "infiltration" should provide suitable results. However, it currently is believed that forming molds comprising an intimate mixture of a mold-forming material or materials and an imaging agent or agent in at least the facecoat provides a preferred process.

The present invention has been described with respect to certain preferred embodiments. However, the present invention should not be limited to the particular features described. Instead, the scope of the invention should be determined by the following claims.

We claim:

1. A method for making a metal or metal alloy article, comprising:
   providing a casting mold comprising an N-ray imaging agent which includes a material comprising a substance selected from the group consisting of lithium, boron, neodymium, samarium, europium, gadolinium, dysprosium, holmium, ytterbium, lutetium, iridium, indium, and mixtures thereof;
   casting a metal or metal alloy article using the casting mold;
   removing the article from the mold;
   determining whether the article has inclusions by nondestructive N-ray imaging; and
   removing an inclusion imaged while determining whether the article has inclusions by nondestructive N-ray imaging.

2. The method according to claim 1 where the N-ray imaging agent includes a material comprising a substance selected from the group consisting of samarium, gadolinium, dysprosium, and mixtures thereof.

3. The method according to claim 1 where the N-ray imaging agent includes gadolinium.

4. The method according to claim 3 where the N-ray imaging agent is gadolinia.

5. The method according to claim 1 where the casting mold includes a facecoat having a refractory material selected from the group consisting of yttria, zirconia, alumina, calcia, silica, zircon, titania, tungsten, and mixtures thereof.

6. A method for real time detection of inclusions in a metal or metal alloy article, comprising:
   providing a cast metal or metal alloy article made using a casting mold comprising an imaging agent in amounts sufficient for imaging inclusions; and
   determining whether the article has inclusions by real time N-ray imaging.

7. The method according to claim 6 where determining comprises analyzing N-ray images produced in real time using an image displaying device.

8. The method according to claim 7 where the image displaying device is a light-emitting fluorescent screen.

9. The method according to claim 6 and further comprising removing any inclusion imaged while determining whether the article has inclusions by real time N-ray imaging.

10. A method for real time detection of inclusions in a metal or metal alloy article, comprising:
    casting a metal or metal alloy article using a mold having a facecoat comprising an imaging agent distributed substantially uniformly throughout in amounts sufficient for imaging inclusions; and
    analyzing the article for inclusions by real time N-ray imaging.

11. The method according to claim 10 where the mold is an investment casting mold, and the imaging agent is distributed substantially uniformly in at least a facecoat layer.

12. The method according to claim 10 where the step of analyzing further comprises X-ray imaging.

13. The method according to claim 10 where the imaging agent includes a material comprising a substance selected from the group consisting of lithium, boron, neodymium, samarium, europium, gadolinium, dysprosium, holmium, erbium, ytterbium, lutetium, iridium, indium, and mixtures thereof.

14. The method according to claim 13 where the imaging agent is a metal salt, a metal oxide, an intermetallic, a boride, or mixtures thereof.

15. The method according to claim 10 where the article comprises a titanium or a titanium alloy, the facecoat comprises yttria or zirconia, and the imaging agent is gadolinia.

16. The method according to claim 10 and further comprising removing any inclusion imaged while determining whether the article has inclusions by real time N-ray imaging.

17. A method for real time detection of inclusions in a metal or metal alloy article, comprising:
    forming an aqueous or non-aqueous facecoat slurry comprising an inclusion imaging agent;
    applying the facecoat slurry to a pattern to form a mold facecoat comprising the imaging agent distributed substantially uniformly throughout in amounts sufficient for imaging inclusions;
    serially applying plural backup layers to the pattern to form a mold for investment casting;
    casting a metal article using the mold; and
    analyzing the article for inclusions using real time N-ray imaging.

18. The method according to claim 17 where analyzing further comprises X-ray imaging.

19. The method according to claim 17 where the imaging agent includes a material comprising a substance selected from the group consisting of lithium, boron, neodymium, samarium, europium, gadolinium, dysprosium, holmium, erbium, ytterbium, lutetium, iridium, indium, and mixtures thereof.

20. The method according to claim 19 where the article comprises titanium or a titanium alloy and the facecoat further comprises a refractory material selected from the group consisting of yttria, zirconia, alumina, calcia, silica, zircon, titania, tungsten, and mixtures thereof.

21. The method according to claim 17 where at least a portion of the metal or metal alloy article has a thickness of greater than about 2 inches.

22. The method according to claim 17 where at least a portion of the metal or metal alloy article has a thickness of greater than about 1 inch, the imaging agent is gadolinia, and alpha case in the article is less than or equal to that when the facecoat is yttria.

23. The method according to claim 17 and further comprising removing any inclusion imaged while determining whether the article has inclusions by real time N-ray imaging.

24. A method for real-time detection of inclusions in a titanium or titanium alloy article produced by investment casting, comprising:

forming an aqueous or non-aqueous investment casting facecoat slurry comprising an intimate mixture of a mold-forming material selected from the group consisting of yttria, zirconia, alumina, calcia, silica, zircon, titania, tungsten, physical mixtures thereof, and chemical mixtures thereof, and an imaging agent in an amount sufficient to allow imaging of inclusions in the article, the imaging agent including a material comprising a substance selected from the group consisting of lithium, boron, neodymium, samarium, europium, gadolinium, dysprosium, holmium, erbium, ytterbium, lutetium, iridium, indium, physical mixtures thereof and chemical mixtures thereof;

applying the slurry to a pattern to form a mold facecoat comprising the intimate mixture of the mold-forming material and the imaging agent distributed substantially uniformly throughout in amounts sufficient for imaging inclusions wherein a linear attenuation coefficient of the article and a linear attenuation coefficient of the imaging agent are sufficiently different to allow imaging of the inclusion throughout the article by real time N-ray imaging;

serially applying plural backup layers to the pattern and thereafter firing the pattern to form a mold for investment casting;

casting a titanium or titanium alloy article using the mold; and analyzing the article for mold inclusions by real time N-ray imaging.

25. The method according to claim 24 where analyzing further comprises X-ray imaging.

26. The method according to claim 24 where at least one backup layer also comprises an imaging agent.

27. The method according to claim 24 where the mold-forming material is yttria and the imaging agent is gadolinia.

28. The method according to claim 24 where the facecoat comprises yttria cocalcined with gadolinia.

29. The method according to claim 24 where the facecoat comprises a refractory material and plural imaging agents.

30. The method according to claim 24 and further comprising removing any inclusion imaged while determining whether the article has inclusions by real time N-ray imaging.

31. The method according to claim 24 where the mold forming material is present in an amount from about 95 weight % to about 5 weight % and the imaging agent is present in an amount from about 5 weight % to about 95 weight %.

32. A method for detecting inclusions in investment castings, comprising:
placing a solution of at least one imaging agent inside a cavity of an investment casting mold;
allowing the solution to remain in the cavity for a sufficient period of time to infiltrate at least the facecoat of the mold;
removing the solution from the cavity;
casting a metal or metal alloy article using the mold; and
analyzing the article for mold inclusions by N-ray imaging.

33. The method according to claim 32 where the imaging agent includes a material comprising a substance selected from the group consisting of lithium, boron, neodymium, samarium, europium, gadolinium, dysprosium, holmium, erbium, ytterbium, lutetium, iridium, indium, and mixtures thereof.

34. The method according to claim 32 where the imaging agent comprises gadolinium, the metal or metal alloy is titanium or a titanium alloy, and the facecoat comprises yttria.

35. The method according to claim 32 and further comprising analyzing the article for inclusions by X-ray imaging.

36. The method according to claim 32 where the solution comprises plural imaging agents.

37. The method according to claim 32 and further comprising placing the mold in a chamber and reducing the pressure in the chamber to facilitate solution infiltrating the mold.

38. The method according to claim 32 and further comprising removing any inclusion imaged while determining whether the article has inclusions by N-ray imaging.

39. A method for detecting inclusions in investment castings, comprising
forming an investment casting mold facecoat about a pattern;
infiltrating at least a portion of the facecoat using an aqueous or non-aqueous solution of at least one imaging agent comprising a material selected from the group consisting of lithium, boron, neodymium, indium, samarium, europium, gadolinium, dysprosium, holmium, erbium, ytterbium, lutetium, iridium, physical mixtures thereof and chemical mixtures thereof;
casting a metal or metal alloy article using an investment casting mold having the facecoat; and
analyzing the article for inclusions by N-ray imaging.

40. The method according to claim 39 and further including
forming plural mold backup layers about the pattern; and
infiltrating at least one of the plural mold backup layers with the solution of the imaging agent.

41. The method according to claim 39 where infiltrating comprises immersing at least a portion of the pattern having the facecoat into an aqueous or non-aqueous solution comprising the imaging agent for a period of time sufficient to infiltrate the facecoat with imaging agent.

42. The method according to claim 39 where analyzing the article comprises using moderated neutrons.

43. The method according to claim 34 where analyzing comprises real time imaging.

44. The method according to claim 39 and further comprising removing any inclusion imaged while determining whether the article has inclusions by N-ray imaging.

45. A method for determining whether a metal or metal alloy article has inclusions in real time, comprising:
providing a cast metal or metal alloy article made using a casting mold comprising an N-ray imaging agent in an amount sufficient for imaging inclusions; and
determining whether the article has inclusions by real time N-ray imaging using neutrons selected from the group consisting of fast, epithermal, thermal and cold neutrons.

46. The method according to claim 45 where the imaging agent comprises an intimate mixture of a refractory material and the imaging agent.

47. The method according to claim 45 where the casting mold is infiltrated using solutions of imaging agents.

48. The method according to claim 45 where the mold comprises a mold-forming material selected from the group consisting of yttria, zirconia, alumina, calcia, silica, zircon, titania, tungsten, and mixtures thereof, and the imaging agent includes a material comprising a substance selected from the group consisting of lithium, boron, neodymium, samarium, europium, gadolinium, dysprosium, holmium, erbium, ytterbium, lutetium, iridium, indium, and mixtures thereof.

49. The method according to claim 45 and further comprising removing any inclusion imaged while determining whether the article has inclusions by real time N-ray imaging.

50. A method for imaging inclusions in a cast metal article, comprising:
   forming a mold having a facecoat comprising from about 5 weight % to about 95 weight % gadolinia and from about 95 weight % to about 5 weight % refractory material;
   casting a metal article in the mold; and
   imaging inclusions in the metal article using non-destructive N-ray imaging to detect the location of the inclusions within the intact metal article.

51. The method of claim 50 where the mold has a facecoat comprising from about 10 weight % to about 50 weight % gadolinia and from about 90 weight % to about 50 weight % yttria.

52. The method of claim 50 where the metal article comprises titanium.

53. The method of claim 50 further comprising removing an inclusion imaged from the metal article while imaging inclusions using non-destructive N-ray imaging.

54. The method of claim 50 where non-destructive N-ray imaging is performed in real time.

55. The method of claim 50 where non-destructive N-ray imaging comprises imaging inclusions using neutrons selected from the group consisting of fast, epithermal, thermal and cold neutrons.

56. A method for imaging inclusions in a cast titanium metal or titanium alloy article, comprising:
   forming a mold having a facecoat comprising from about 10 weight % to about 95 weight % gadolinia and from about 90 weight % to about 5 weight % yttria;
   casting a titanium or titanium metal alloy article in the mold;
   imaging inclusions in the metal article by real-time, non-destructive N-ray imaging using neutrons selected from the group consisting of fast, epithermal, thermal and cold neutrons to detect the location of the inclusions within the intact metal article; and
   removing an inclusion imaged from the article while imaging inclusions using non-destructive N-ray imaging.

57. A method for determining whether a titanium or titanium alloy article has inclusions, comprising:
   providing a cast titanium or titanium alloy article made using a casting mold comprising about 2 weight % to about 25 weight % gadolinia as an N-ray imaging agent; and
   determining whether the article has inclusions by nondestructive N-ray imaging.

58. A method for making a titanium or titanium alloy article, comprising:
   providing a casting mold comprising about 2 weight % to about 25 weight % gadolinia; and
   casting a titanium or titanium alloy article using the casting mold.

59. The method according to claim 58 further comprising determining whether the article has inclusions by N-ray analysis.

60. The method according to claim 58 wherein the casting mold further comprises yttria.

61. A method for determining whether a cast titanium or titanium alloy article made using a casting mold comprising about 2 weight % to about 25 weight % gadolinia has inclusions, comprising subjecting the article to nondestructive N-ray imaging.

62. A method for determining whether a titanium or titanium alloy article has inclusions, comprising:
   providing a cast titanium or titanium alloy article made using a casting mold comprising as an N-ray imaging agent an amount of gadolinia sufficient for N-ray image detection up to about 40 weight %; and
   determining whether the article has inclusions by nondestructive N-ray imaging.

63. A method for making a titanium or titanium alloy article, comprising:
   providing a casting mold comprising as an N-ray imaging agent an amount of gadolinia sufficient for N-ray image detection up to about 40 weight %; and
   casting a titanium or titanium alloy article using the casting mold.

64. A method for determining whether a cast titanium or titanium alloy article made using a casting mold comprising as an N-ray imaging agent an amount of gadolinia sufficient for N-ray image detection up to about 40 weight % has inclusions, comprising subjecting the article to nondestructive N-ray imaging.

65. A method for determining whether a titanium or titanium alloy article has inclusions, comprising:
   providing a cast titanium or titanium alloy article made using a casting mold comprising gadolinia as an N-ray agent in an amount sufficient for imaging inclusions in the article, wherein a substantially similar or reduced amount of alpha-case is formed relative to using a casting mold comprising substantially 100 weight % yttria; and
   determining whether the article has inclusions by nondestructive N-ray imaging.

66. A titanium or titanium alloy cast article that includes at least one N-ray imaging agent-containing inclusion.

67. The article of claim 66 wherein the N-ray imaging agent includes a material selected from lithium, boron, neodymium, samarium, europium, gadolinium, dysprosium, holmium, lutetium, iridium, indium, physical mixtures thereof and chemical mixtures thereof.

68. The article of claim 66 wherein the N-ray imaging agent comprises gadolinia.

69. The article of claim 66 wherein the N-ray imaging agent-containing inclusion comprises an intimate mixture of the N-ray imaging agent and a mold-forming material.

70. An investment casting mold comprising at least a facecoat that includes an intimate mixture of an N-ray imaging agent and a mold-forming material.

71. The mold of claim 70 wherein the N-ray imaging agent includes a material selected from lithium, boron, neodymium, samarium, europium, gadolinium, dysprosium, holmium, lutetium, iridium, indium, physical mixtures thereof and chemical mixtures thereof.

72. The mold of claim 70 wherein the N-ray imaging agent comprises gadolinia.

73. The mold of claim 70 wherein the mold-forming material comprises a refractory material selected from yttria, zirconia, alumina, calcia, silica, zirconia, titania, tungsten, physical mixtures thereof, and chemical mixtures thereof.

74. The mold of claim 70 wherein the N-ray imaging agent comprises gadolinia and the mold-forming material comprises yttria.

75. The mold of claim 74 wherein the facecoat comprises about 2 weight % to about 25 weight % gadolinia.

76. The mold of claim 74 wherein the facecoat comprises an amount of gadolinia sufficient for N-ray image detection up to about 40 weight %.

77. A method for determining whether a metal or metal alloy article has inclusions, comprising:

providing a cast metal or metal alloy article made using a casting mold comprising india as an N-ray imaging agent; and determining whether the article has inclusions by nondestructive N-ray imaging.

78. A method for making a metal or metal alloy article, comprising:

providing a casting mold comprising india; and casting a metal or metal alloy article using the casting mold.

79. An intimate mixture of gadolinia and yttria produced by fusing together gadolinia and yttria or by atomically dispersing gadolinia in yttria.

80. A method of making an investment casting mold from an intimate mixture of an N-ray imaging agent and a mold-forming material, the method comprising applying the mixture to a pattern and solidifying the mixture to form the mold.

* * * * *